United States Patent
Dixit et al.

(10) Patent No.: US 7,184,523 B2
(45) Date of Patent: Feb. 27, 2007

(54) VOICE MESSAGE BASED APPLETS

(75) Inventors: Rajeev K. Dixit, Westford, MA (US); Robert E. Braudes, Danvers, MA (US)

(73) Assignee: Comverse, Inc., Wakefield, MA (US)

( * ) Notice: Subject to any disclaimer, the term of this patent is extended or adjusted under 35 U.S.C. 154(b) by 441 days.

(21) Appl. No.: 10/284,353

(22) Filed: Oct. 31, 2002

(65) Prior Publication Data

US 2004/0086095 A1 May 6, 2004

(51) Int. Cl.
*H04M 1/64* (2006.01)

(52) U.S. Cl. .................... 379/88.17; 379/88.22

(58) Field of Classification Search ........... 379/67.1, 379/68, 88.13, 88.17, 88.22, 93.01, 201.01; 709/201, 217, 218, 219, 230, 206

See application file for complete search history.

(56) References Cited

U.S. PATENT DOCUMENTS 6,014,427 A * 1/2000 Hanson et al. ........... 379/88.18
6,181,781 B1 * 1/2001 Porter et al. ............. 379/88.17
2002/0059073 A1 * 5/2002 Zondervan et al. ...... 704/270.1

\* cited by examiner

*Primary Examiner*—Ovidio Escalante
(74) *Attorney, Agent, or Firm*—Staas & Halsey LLP

(57) ABSTRACT

The present invention is a system that allows users to compose and deliver voicemail messages that contain embedded applets. Users may interact with the system via telephone, multi-access device, PC, or any number of other devices. Users may also interact with the system via a variety of interfaces such as speech, dual tone multi-frequency, and graphical user interface. The system allows user to compose voicemail messages with embedded applets for delivery to multiple recipients. The applets provide the sender with the ability to leverage the voice messaging system so as to take full advantage of all systems and applications of the computer platform upon which the applet is being run. The voice message based applets may be updated dynamically based upon variables such as when the recipient receives the message. The message sender may also configure the system to provide notification and statistics regarding receipt of the message and embedded applets.

22 Claims, 10 Drawing Sheets

VOICE MESSAGE-BASED APPLET PLATFORM

FLOW DIAGRAM FOR APPLET COMPOSITION AND DEPOSIT USING PHONE OR MULTI-ACCESS DEVICE

APPLET COMPOSER APPLICATION CODE GENERATION

APPLET COMPOSER APPLICATION CODE GENERATION

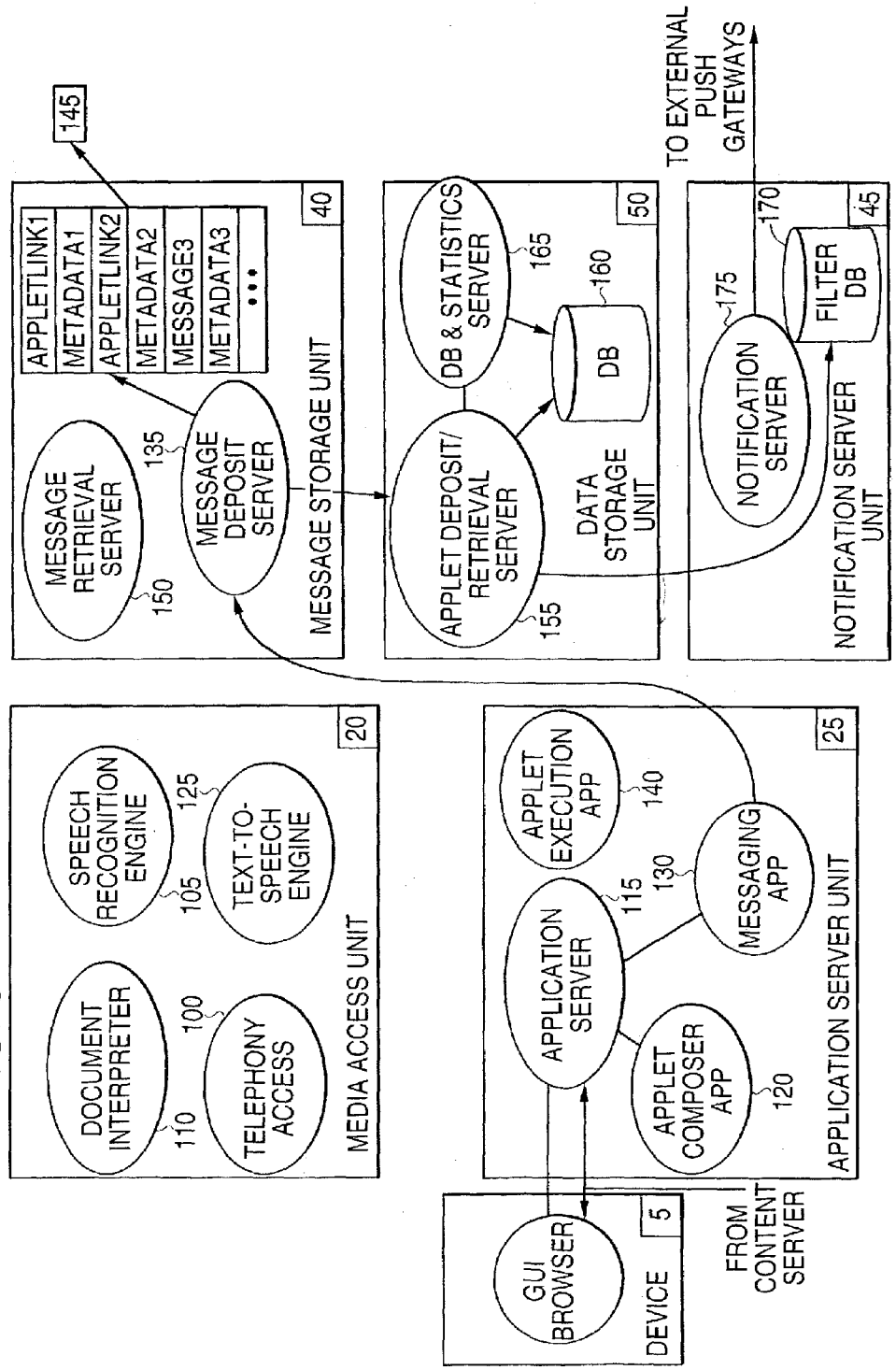
FIG. 5 APPLET COMPOSITION AND DEPOSIT USING WEB-BASED DEVICE

FLOW DIAGRAM FOR APPLET COMPOSITION AND DEPOSIT USING DEVICE

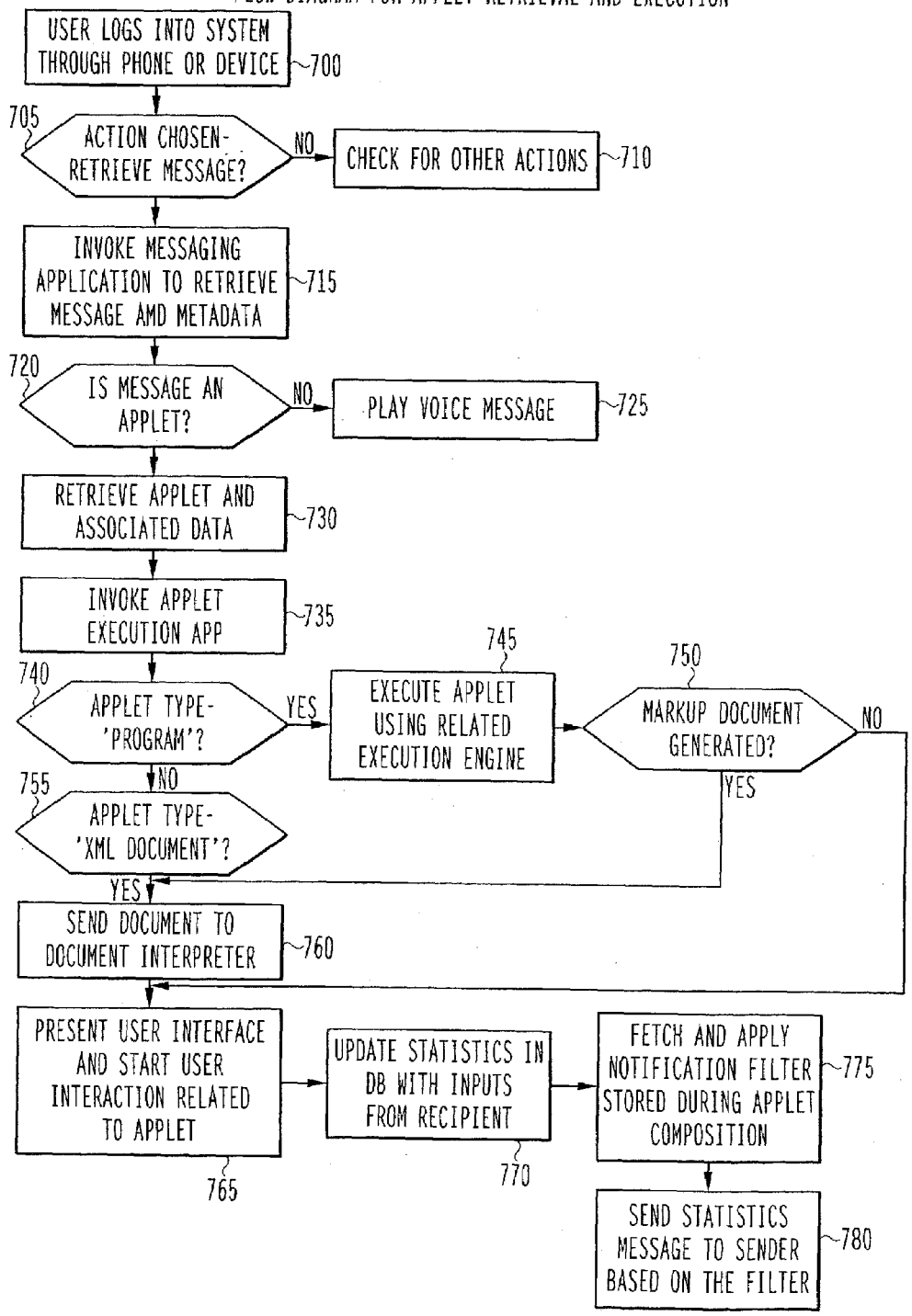

VOICE MESSAGE BASED APPLETS

BACKGROUND OF THE INVENTION

1. Field of the Invention

The present invention is directed to a system for building and delivering computer applications via voice messaging systems and, more particularly, the present invention provides a system for transferred computer applications to leverage voice messaging systems to utilize the complete services of the computer platform upon which the applications are run.

2. Description of the Related Art

The proliferation of the Internet and networks such as corporate intranets and has increased the need for computers to be able to transmit programs and documents to one another and various computer operated devices. Communication between computers at different physical locations has become an essential part of modern business. Hyper Text Markup Language (HTML) is the document format most frequently used to display documents on the World Wide Web. HTML facilitates the transfer of documents via the Internet, but does not assist in the transfer of programs.

Programming, languages such as Java, allow for the creation of small programs that may be attached to web pages and move from computer to computer via the Internet. These Web-based applications or programs have been around for several years and are commonly referred to as "applets." Applets are able to run on any number of computer platforms without the need to install software or modify the operating system settings of the computer running the applet. When a computer user requests a webpage containing a Java applet, the server automatically transfers the applet to the requesting user's browser. Once received by a browser, the browser typically activates an incorporated Java Virtual Machine and the applet is executed on the client computer by the browser and may receive assistance from the server computer.

Applets are also increasingly delivered via electronic mail (email) as businesses and individuals search for new means of transferring programs from one computer to another. Applets that are commonly sent via electronic mail also include rogue applications such as computer viruses and worms.

Voice messaging systems have also proliferated on telephone networks throughout the world. These systems are largely computerized telephone answering systems that digitize incoming voice messages and store them on disk. Voice messaging systems usually provide auto attendant features that use prerecorded messages to route the telephone caller to the appropriate person, department, or mailbox. Voice messaging systems may also offer advanced features such as directory lookup by parties' names, broadcast messaging, and delayed delivery of pre-recorded voice messages.

Despite the prevalence of voice messaging systems, and an increasing need for methods of transferring computer programs between different computers, computer users presently lack the ability to transfer computer applications via voice messaging systems.

SUMMARY OF THE INVENTION

It is an aspect of the present invention to provide system for building and delivering computer applications via voice messaging systems. The invention leverages voice messaging systems by extending their capabilities to allow the systems to deliver speech-based or Graphical User Interface (GUI)-based applications to message recipients using various infrastructures and delivery mechanisms.

It is an additional aspect of the present invention to provide a system for creating applets to be delivered as part of the payload of voice messages. In voice messaging systems, a class of this type of application is an Interactive Voice Response (IVR) system. However, the present invention not limited to IVR applications. Programming paradigms such as VoiceXML (VXML) and Speech Application Language Tags (SALT) are being developed to allow for rapid development and execution of speech-based applications. The present invention allows applications developed in such languages to be rapidly disseminated to targeted recipients.

The above aspects can be attained by a system that allows application developers to use whatever toolset they consider appropriate to build an application and package the application in the payload of a voicemail message. The messaging system denotes that the message contains an applet instead of, or in addition to, a traditional voice message and the message is delivered using either traditional messaging, where the message is deposited in a mailbox for retrieval by the recipient, or is delivered proactively by calling receipients. In either case, when the recipient listens to the message, the appropriate execution engine, i.e., Java virtual machine, VXML interpreter, SALT browser, application server, etc., executes the application that was embedded in the message. The recipient can use a wide variety of conventional interfaces to listen to the message. Where the recipient elects to use a personal computer to listen to the voicemail message, a conventional unified messaging system can provide the interface to listen to the voicemail message. The execution engine can run on either the server side or on the client side, depending on the capabilities of the device used by the recipient to retrieve the message.

The application has at its disposal the complete services of the computer platform, including e.g., telephony control, conferencing, messaging in whatever media is supported by the platform—voice, email, video—as well as media transformation capabilities including but not limited to speech recognition, text-to-speech, media transcoding, and speaker verification.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 depicts component interaction for applet composition and deposit using a web-based device.

FIG. 8 depicts a flow diagram for applet retrieval and execution.

DETAILED DESCRIPTION OF THE PREFERRED EMBODIMENTS

Figure 1:
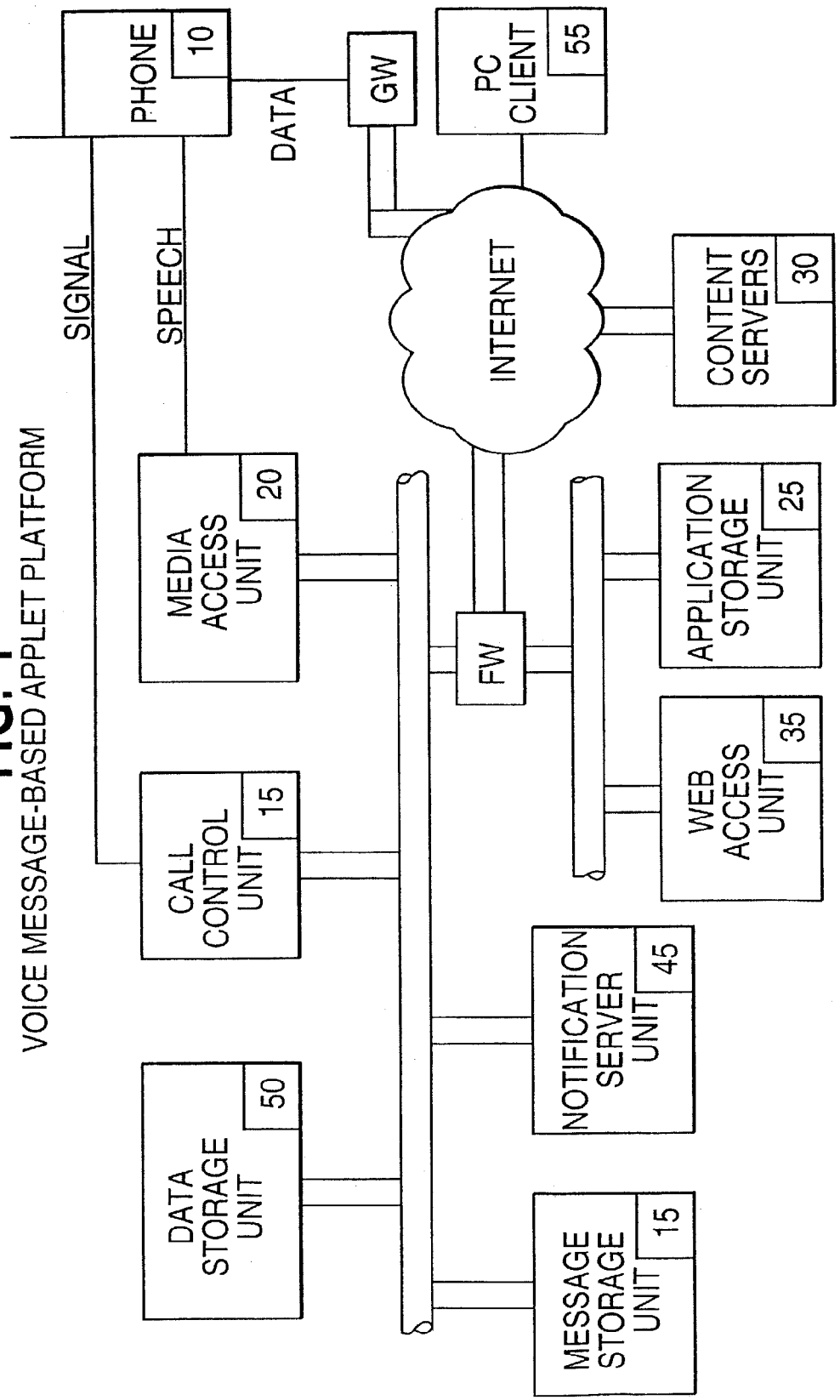
FIG. 1 depicts a broad overview of the architecture of Voice Message-Based Applet Platform.

A voice messaging system message containing an applet can be composed using, e.g., a phone, a PC based web client, or a fixed or mobile device with display and record capabilities. The composition of such a message requires a new type of interaction with the person composing the message.

Messages containing an applet or applets are useful for sending interactive voice messages such as messages to a group for surveys, polling or quizzes; messages containing bank/credit card statements with interactive options; and entertaining messages between individuals (e.g., "Guess when my birthday is —Enter the date on the keypad or say it").

In situations involving group messaging, the system provides a global storage area to store the results of the recipients' inputs received during execution of the applet or applets attached to the group message. The stored results can be sent to the message composer/sender after all messages have been read. For example, the sender can request the statistics of the survey or polling by dialing into the system or the sender can be notified automatically via out-dial calls, paging, Short Message Service (SMS), or email, after each recipient has read the message. The sender can also be notified of overall statistics after all recipients have read the messages. The reporting function can be a system-level configuration parameter or the sender can specify his or her preference before sending a message.

Messages containing applets may also facilitate access to additional attachments within the message based on the listener's input. Examples of additional attachments to the message are other voicemails, interactive messages, emails, or any other web content such as news, music, or stock information, or links to webpages or other interactive content.

The recipient can interact with the messaging system using a variety of different types of inputs such as Dual-Tone Multi-Frequency (DTMF), voice, gesture (touch-pen), and text. For more complex messaging, the composer will be able to attach other voicemail and email messages, web content, or another interactive message that can be played only after a specific option is chosen. The composer may also specify that Automatic Speech Recognition (ASR) can be accepted as an input when playing the message. ASR uses voice recognition to replace telephone keypad entries for telephone voice menus.

The present invention can support recognition of speech commands while playing the composed message. To specify these inputs, the ASR can also be used during the message composition process. ASR may be used to further enhance the user interface to facilitate creation of complex message applets.

An example of the interaction for composing a simple message including the prompts and input response containing an embedded application for speech-based interaction is shown below.

1. Please record the initial prompt for the recipient
   Input: "Welcome to the Employee Satisfaction Survey"
2. Press "O" if options are expected, "D" if digit(s) are expected for input, "S" if speech is expected for input, "T" to transfer, and "#" to terminate this dialog
   Input: D
3. Please record the prompt for this option
   Input: "Please enter your 5 digit employee number"
4. Enter the maximum number of digits expected in the input
   Input: 5
5. Press "O" if options are expected, "D" if digit(s) are expected for input, "S" if speech is expected for input, "T" to transfer, and "#" to terminate this dialog
   Input: O
6. Please record the prompt for this option
   Input: "Please enter 1 if you are very satisfied with your job, 2 if you are satisfied, and 3 if you are unsatisfied"
7. Enter the total number of options
   Input: 3
8. Please record the prompt to play if recipient presses "1," "#" to terminate this dialog
   Input: "Nice to hear this"
9. Press "O" if options are expected, "D" if digit(s) are expected for input, "S" if speech is expected for input, "T" to transfer, and "#" to terminate this dialog
   Input: #
10. Please record the prompt to play if recipient presses "2", "#" to terminate this dialog
    Input: "Let us know how can we help"
11. Press "O" if options are expected, "D" if digit(s) are expected for input, "S" if speech is expected for input, "T" to transfer, and "#" to terminate this dialog
    Input: #
12. Please record the prompt to play if recipient presses "3", "#" to terminate this dialog
    Input: "Would you like to talk to the human resource department? Please say yes or no"
13. Press "O" if options are expected, "D" if digit(s) are expected for input, "S" if speech is expected for input, "T" to transfer, and "#" to terminate this dialog
    Input: S
14. Please say the recognition type expected or say "help" to hear the list of built-in recognition types
    Input: yes no
15. Record the prompt to play if recipient says "yes", "#" to terminate this dialog
    Input: "Please wait. Transferring to HR department"
16. Press "O" if options are expected, "D" if digit(s) are expected for input, "S" if speech is expected for input, "T" to transfer, and "#" to terminate this dialog
    Input: T
17. Please enter the phone number to transfer the recipient
    Input: 12025551212

18. Press "O " if options are expected, "D" if digit(s) are expected for input, "S" if speech is expected for input, "T" to transfer, and "#" to terminate this dialog
   Input: #
19. Please record the prompt to play if recipient says "no", "#" to terminate this dialog
   Input: #
20. Press "O " if options are expected, "D" if digit(s) are expected for input, "S" if speech is expected for input, "T" to transfer, and "#" to terminate this dialog
   Input: #
21. Press "O " if options expected, "D" if digit(s) are expected for input, "S" if speech is expected for input, "T" to transfer, and "#" to terminate this dialog
   Input: #
22. Record the end prompt, "#" to terminate this dialog
   Input: "Thank you for filling out employee satisfaction survey"

When the recipient receives the above-composed voicemail the message will be played as follows.
1. Welcome to Employee Satisfaction Survey
2. Please enter your 5 digit employee number
   Input: 12345
3. Please enter 1 if you are very satisfied with your job, 2 if you are satisfied and 3 if you are unsatisfied
   Input: 3
4. Would you like to talk to human resource department? Please say 'yes' or 'no'
   Input: yes
5. Please wait. Transferring to HR department
   <Recipient talked with HR and HR hung up the phone>
6. Thank you for filling out employee satisfaction survey The user interface for composing a message with an embedded applet can be more intuitive and simpler if composed through a PC-based web-client or a mobile device with display capabilities.

The interaction below is an example of interaction between a message composer and the system for composing a message applet with embedded dynamic content. Once again the prompts and the input response are shown. The dynamic content, e.g., a stock quote, is obtained when the when the recipient reads the message and the applet is executed. This ensures that the recipient receives a current stock price quote and not a quote as of the date and time the message is sent.
1. Please record the initial prompt for the recipient
   Input: "Welcome to the Stock Quote Service."
2. Press "O " if options are expected, "D" if digit(s) are expected for input, "S" if speech is expected for input, "T" to transfer, "W" to invoke external service, and "#" to terminate this dialog
   Input: O
3. Please record the prompt for this option
   Input: "Please enter 1 if would like to hear the current stock price of your favorite stocks, 2 if you would like to edit your favorite stock symbol list, 3 to quit"
4. Enter the total number of options
   Input: 3
5. Record the prompt to play if recipient presses "1", "#" to terminate this dialog
   Input: "Please wait . . . Accessing current stock prices. Here is the current status of your stocks"
6. Press "O " if options are expected, "D" if digit(s) are expected for input, "S" if speech is expected for input, "T" to transfer, "W" to invoke external service, and "#" to terminate this dialog
   Input: W
7. Please select from the list of external services available. Press 1 for stock, 2 for weather, 3 for traffic conditions on recipient's route
   Input: 1
8. Record the prompt to play if recipient presses "2", "#" to terminate this dialog . . . etc.

When the recipient accesses the message the following dialog will be played.
1. Welcome to the Stock Quote Service
2. Please enter 1 if would like to hear the current stock price of your favorite stocks, 2 if you would like to edit your favorite stock symbol list, 3 to quit
   Input: 1
3. Please wait . . . Accessing current stock prices. Here is the current status of your stocks—ABC is one hundred and one dollars, twenty-two cents, XYZ is twenty four dollars and three cents, LLL is three dollars and forty five cents
   Input: 3

The present invention can be implemented in a system, such as illustrated in FIG. 1. FIG. 1 depicts a broad overview of the architecture of Voice Message-Based Applet Platform and depicts one type of interaction that may be used to compose or retrieve a voice message with an embedded applet. A system user (in the present example "message sender" or "sender") may connect to the voice message-based applet platform through his or her phone 10. The phone 10 can be a device that supports speech-only interface or speech and data channels and can be used as an interface to the system for composing applets. The phone 10, in addition to initiating the execution of the applets, may be used as an interface to the system for composing applets. The system also supports phones 10 that have a single channel for both speech and data. A message sender begins use of the system by connecting to the system with his/her phone 10.

In networks with out-of-band signaling the call is received by a call control unit 15, which handles signaling and forwarding related to setting up and tearing down of the calls coming into the system. Both standard circuit-switched and packet-switched telephony interfaces/protocols are supported by the call control unit 15. The call control unit 15 forwards the call to a media access unit 20 to provide an interface to the sender. For networks with in-band signaling the call is directly received by a media access unit 20. A media access processing unit 20, such as a server class computer, provides access to capability servers such as an automated speech recognition (ASR) server and text-to-speech (TTS) server, which can be either part of the media access processing unit 20, or separate. The capability servers of the media access unit 20 provide the sender with various options for interfacing with the system. The media access unit 20 provides telephony ports and access software to receive and send speech to the phone 10 or other device used by the sender to connect to the system. The sender's inputs are processed by the media access unit 20 and forwarded to an application server unit 25 that is another server class machine. All processing inside the firewall can be supported on a single piece of hardware, as could all processing outside the firewall. The application server unit 25 can also be inside the firewall with a proxy server outside the firewall. The application server unit 25 provides a framework for running applications. Based upon the sender's inputs, the application server unit 25 invokes the appropriate application. Examples include a messaging application, an applet composer application, and an applet execution application. The applications generate documents such as XML documents that are interpreted by the interpreter running on the media access unit 20. For example, VoiceXML or SALT could be used for voice-based applications. The application server unit 25 could host a standard environment such as the Java 2 Platform, Enterprise Edition, (J2EE) or could host a proprietary environment.

If the sender has elected to compose a new voicemail message with an embedded applet, the application server unit 25 would invoke the applet composer application. If the system user elects to check his or her messages, the application server unit 25 would invoke a messaging application to retrieve the appropriate messages and applets. Where applet composition is selected, the applet composer application would generate a document to begin requesting inputs from the sender. The application server unit 25 would forward the document to the media access unit 20 and the media access unit 20 would interpret the document and provide the sender with a dialog for soliciting inputs. The media access unit 20 has the capability of providing the dialog to the sender via a number of different interfaces.

The sender input dialog enables the sender to compose the applet and provides the sender with options for including content within the applet. If the sender elects to include external content within the applet, the applet composer application running on the application server unit 25 can access data on the content servers 30, the Internet, an Intranet, Extranet, or private network. The content servers 30 store content that can be embedded in the applet during composition and accessed dynamically during applet runtime and can be played during applet execution. The web access unit 35 provides users access to the system via a data interface.

Once the sender has finished composing the applet, including embedding any external content, or pointers such as Uniform Resource Identifier (URI) or Uniform Resource Locators (URL) for real-time access to external content during applet execution, the applet and associated voicemail message are deposited to the message storage unit 40 for later delivery. The message storage unit 40 provides for storage of voicemail messages, applets and associated data composed by persons using the system. The message storage unit 40 can be a standard off-the-shelf system accessed with standard protocols such as Internet Messaging Access Protocol 4 (IMAP4) or Post Office Protocol 3 (POP3), or the message storage unit 40 could be proprietary in nature.

The sender can also elect to be notified of receipt of the message and statistics regarding recipient input in response to the applet. If the sender desires to receive such notifications, the notification server unit 45 provides services for sending notification by various mechanisms such as paging, out-dial notification, SMS, Multimedia Messaging Service (MMS), Wireless Access Protocol (WAP), PC-popup notification, or any other notification mechanism. The notification server unit 45 can be used to notify the sender of system status or activities such as use statistics or when recipients have read the message.

Upon deposit of the voicemail message to the message storage unit 40, the message storage unit 40 will send any applets that have been embedded to the data storage unit 50. The data storage unit 50 includes an applet deposit/retrieval server, a database and statistics server, and a database. The message storage unit 40 stores links to the location of the applets on the data storage unit 50 so that the applets may be retrieved when a recipient is ready to retrieve messages. The data storage unit 50 also stores profile data for the users who have mailboxes that reside on the system.

The message sender can also use a PC client 55 or similar device to compose or retrieve a message and applet through a GUI. The PC client 55 can provide a simpler and more intuitive applet composition user interface than a speech-only user interface. Where a sender has elected to use a PC client 55 to compose an applet the PC client 55 would interact with the application server unit 25 without need to invoke the call control unit 15 or the media access unit 20. The PC client 55 can also retrieve and thereby execute voice messages containing applets.

Figure 2:
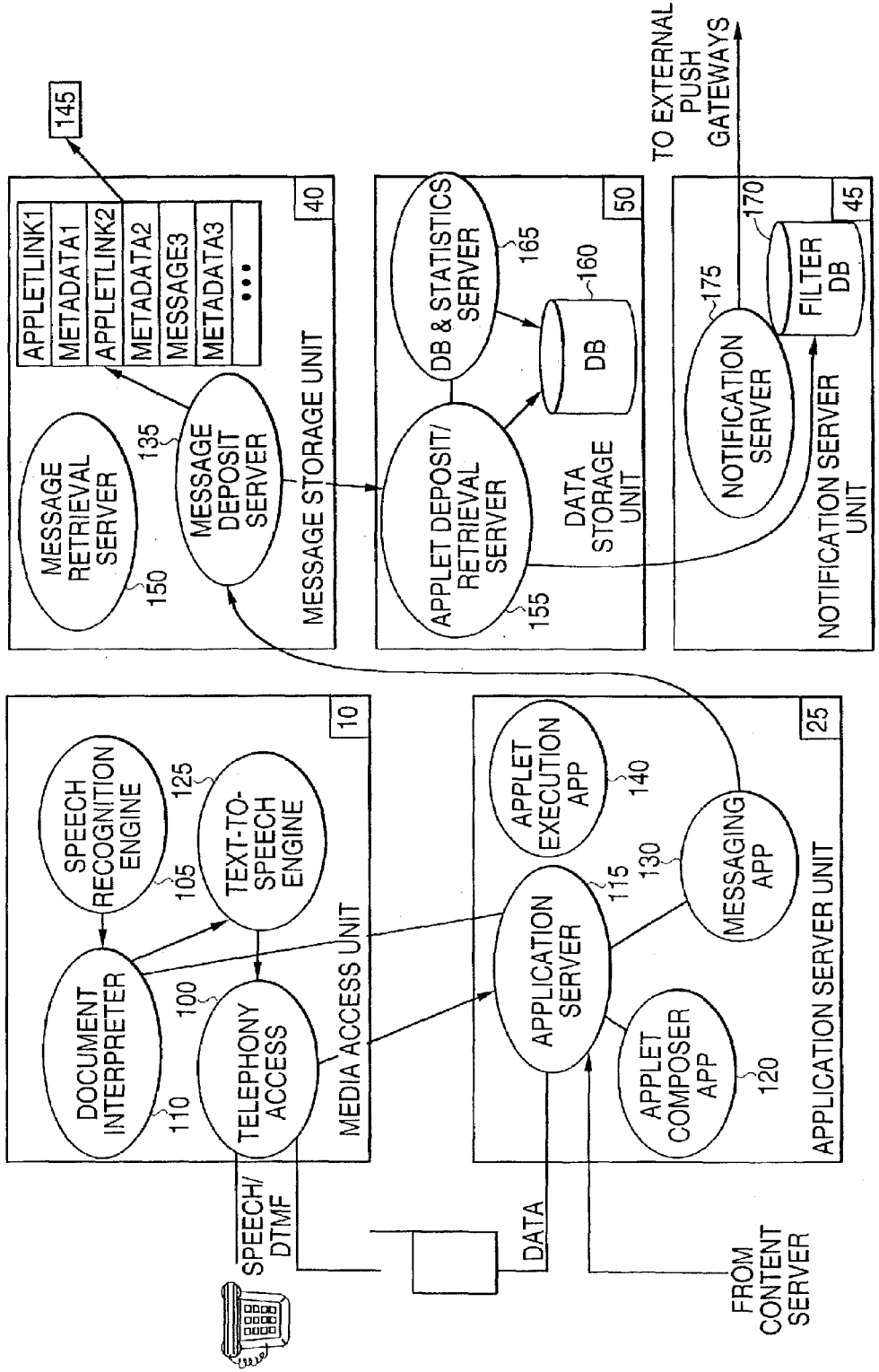
FIG. 2 depicts component interaction for applet composition and deposit.

FIG. 2 depicts the processes involved in applet composition and deposit to the message store using a telephone or device capable of providing simultaneous speech and text inputs (multi-access device). Using his or her telephone or multi-access device, a message sender who wishes to use voice or DTMF to interact with the system connects to the system through a telephony access 100. Upon connection to the system, the main system application is initiated on the application server 115. The application informs the document interpreter 110 of the grammar to be loaded to the speech recognition engine 105. If DTMF is used to issue the command to start the applet creation process, then the telephony access unit 100 translates the tone to the corresponding keypad digits and sends this information to the application server 115. If voice is used for the command, the speech is sent from the telephony access 100 to the speech recognition engine 105 for recognition. The preferred speech recognition engine 105 is a conventional engine that returns the words that most closely match the sender's utterance. The recognized utterance is sent to the application server 115.

The application server 115 then invokes an applet composition application 120, which generates a document to begin the applet composition dialog with the sender. These dialogs are normally rendered in standard mark-up languages such as HTML for a graphical user interface, VoiceXML for a voice user interface, or SALT for a multi-modal user interface, although standard programming languages such as C, C++, or Java can also perform the rendering. If the sender is interacting with the system via voice or DTMF and a markup language is being used, the application server 115 creates the markup in a document and sends the document to the document interpreter 110. The application informs the document interpreter 110 of the grammar to be loaded to the speech recognition engine 105. The document interpreter then plays prompts to the user through the telephony interface 100, by either requesting audio files to be played or by sending text to the text-to-speech engine 125, with the generated speech sent directly from the text-to-speech engine 125 to the telephony interface 100. If the sender is interacting with the system via the data channel of a multi-access device, the application server 115 will send the data directly to the multi-access device without going through the media access unit 20.

If the sender makes a voice input in response to the dialog heard, the telephony access 100 sends the sender's input to the speech recognition engine 105. The speech recognition engine 105 generates a token from the sender's input and the token is sent to the document interpreter 110. If the sender makes a DTMF input in response to the dialog heard, the telephony access 100 sends the keypad equivalent of the tones to the document interpreter 110. The document interpreter 110 interprets the response and sends the data to the applet composer application 120 executing on the application server 115. The applet composer application 120 generates the next document for continuing the applet composition dialog with the sender. The sender interacts with the system in this manner to compose each element and corresponding sub-dialog of the applet.

The sender may also compose a standard voice mail message to accompany the applet. If the sender elects to compose a voicemail message, application server 115 will invoke a messaging application 130 for interaction with the sender. Upon completion of the applet composition dialog and composition of any accompanying voicemail message, the messaging application 130 sends the message with the embedded applet to the message deposit server 135. The messaging application 130 uses the conventional mechanisms of the voicemail platform for sending the voicemail message to the message deposit server 135 and can involve standard protocols such as IMAP4 or POP3 or proprietary protocols.

The message deposit server 135 separates the embedded applets from the voicemail message and sends them to the applet deposit/retrieval server 155. The applet deposit/retrieval server 155 stores the applets in a database 160. The location of the stored applet is sent from the applet deposit/retrieval server 155 to the message deposit server 135. The message deposit server 135 embeds this location 145 in the message and deposits the updated voicemail message in the message store. The applet deposit/retrieval server 155 also interacts with a database and statistics server 165. The database and statistics server 165 initializes storage for usage statistics and responses in the database 160. The usage statistics track information such as the number of times an applet has been invoked and the number of times a response has been selected. For responses that contain data, such as a user's identification number, storage is allocated in the database 160. The applet deposit/retrieval server 155 also forwards the sender's delivery and statistics notification preferences to a filter database 170. A notification server 175 is used during applet retrieval and delivery.

The present invention preferably operates with a set of code templates including code statements that are completed based on collected dialog parameters. The code templates and the parameters collected by the process as described below cover the typical operations that are encountered in a dynamic interaction that can occur over a telephone, such as occurs where the user responds to prompts to select options and cause a function to be executed, such as a transfer to a particular extension in an automated attendant. If other functions than these typical functions are to be performed by the voice mail message applet, a person of ordinary skill in the art can add to or change the templates or create a new template, and augment the parameter collection process and the composer application to allow such functions to be incorporated into the applet to be created.

The process discussed below with respect to FIGS. 3A and 3B collects the parameters that are passed to the applet composer application 120 previously discussed with respect to FIG. 2 and further discussed with respect to FIGS. 4A and 4B.

Figure 3A:
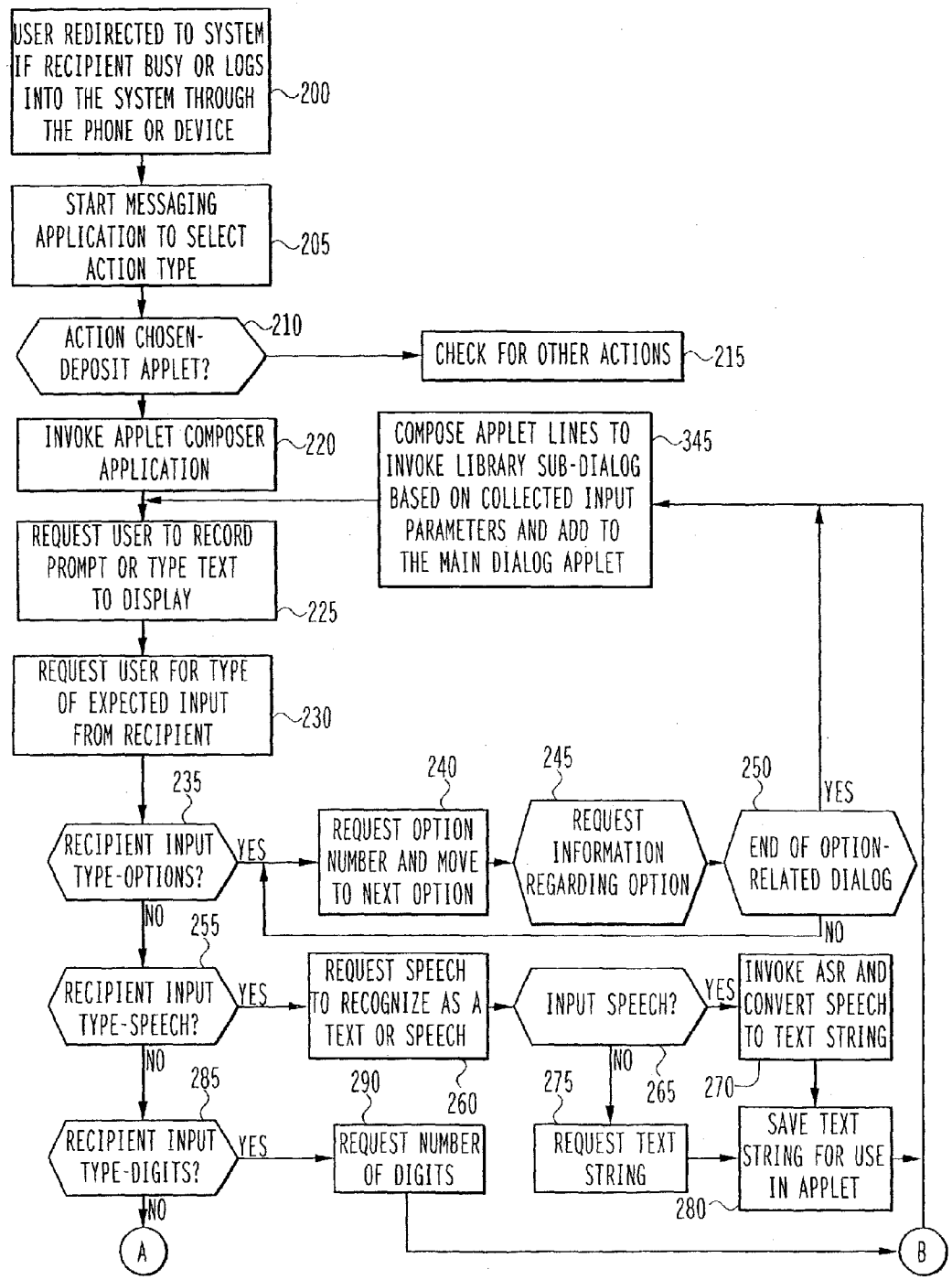
FIGS. 3A and 3B depict a flow diagram for applet composition and deposit using a phone or multi-access device.
Figure 3B:
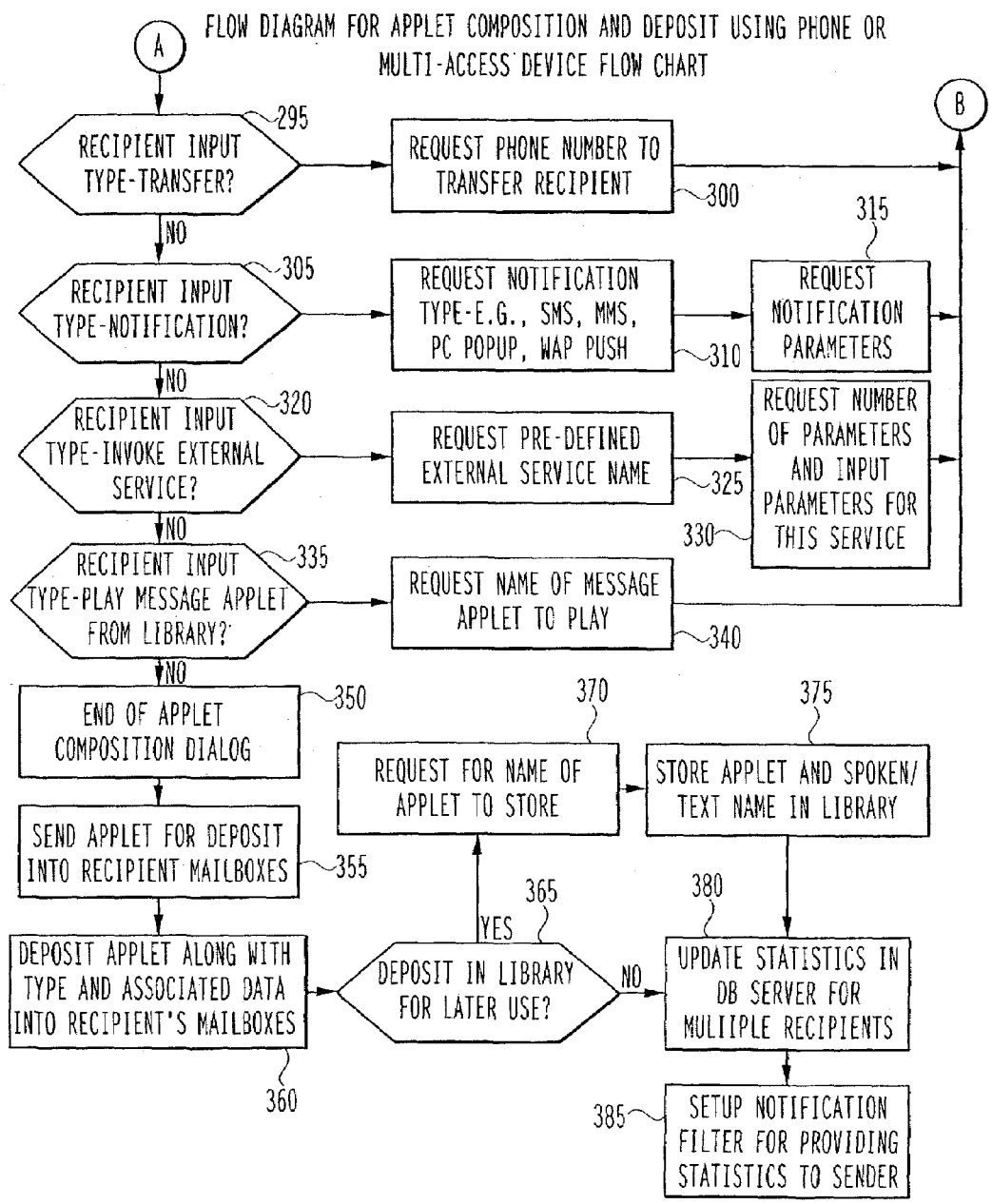

FIGS. 3A and 3B depict a flow diagram for applet composition and deposit using a phone or multi-access device. The sender dials the number for the voicemail system with a multi-access device that is capable of providing simultaneous voice and data inputs and logs 200 into the voice-message based applet system either through the data or voice channel. By logging 200 into the system, the sender may elect to compose an applet and deposit the applet into single or multiple recipients' mailboxes. After logging 200 into the system, a messaging application is started, which allows the sender to select 205 the action to be taken. The sender may elect to compose an applet or to deposit an applet that was previously developed and saved in a personal library or repository for accessing at a later date. The sender has the ability to create a custom library of commonly used applets and use them as components to create new applets.

The system inquires 210 whether the sender would like to deposit a previously composed applet. If the sender elects to deposit a previously composed applet, the system will inquire 215 whether other actions are desired. If the sender elects to compose a new applet, the application server will invoke 220 the applet composer application. The applet composer application presents a user interface through speech, GUI, or a combination of both. The sender will then begin composing the new applet. The present example applet consists of a dialog between the system and recipients. The applet composition application requests 225 that the sender record a prompt or type text to display to the message recipient. The sender is then requested 230 to specify the type of input expected from the recipient. Examples of the types of input are "Options", "Speech", "Digits", "Transfer", "Notification", "Invoke external Service", and "Play message applet from library".

If the sender elects 235 "Options" for the recipient input the system then requests 240 the number of options desired. The system then prompts the sender for the type of recipient input. The system engages in a dialog with the user for each input to be solicited from the ultimate recipient. The prompts that are to be played and input that is to be collected are gathered and saved for incorporation into the applet. After receiving the sender's input for each option the sender is asked 245 for information regarding the option. The sender is then asked 250 whether there are additional options for recipient input. If the sender responds yes, the option composition dialog continues. If the sender responds no, the option composition dialog between the sender and the system is complete.

If the sender elects 255 "Speech" for recipient input, the sender can either type in the text for the system to recognize or provide a speech input. Once the sender has elected 255 to include speech as an input in the applet that is being composed, the system requests 260 that the sender provide the speech input expected from the recipient(s). The sender may express the expected speech input via natural language or via text input. The system identifies 265 whether the sender has provided the expected recipient speech dialog via natural language. If the sender has provided the speech via natural language, the system invokes 270 automated speech recognition (ASR) and the expected recipient input provided by the sender is recognized and converted into a text string. If the sender has not expressed the expected speech input via natural language, the system requests 275 that the sender provide a text string for the expected speech. A limited vocabulary grammar is then activated based upon the sender's input. Examples of the vocabulary grammar would be date, time, numbers, yes/no etc. The system then saves 280 the converted speech or text as a grammar for speech to be recognized during applet execution.

If the sender elects (See FIG. 3B) 285 "Digits" for recipient input, the number of expected digits is requested 290 from the sender.

If the sender selects 295 transfer as an option for recipient input, the recipient's interaction with the system will result in transfer of the call. The system then requests 300 that the sender input the telephone number or extension to which the call will be transferred. If the sender selects 305 that recipient execution of the applet will generate a notification, the notification type is requested 310 from the sender. The related notification parameters such as pager number, WAP/SMS/MMS identification, etc., are also requested 315 from the sender.

If the sender selects 320 that the recipient's interaction may invoke external service at this point, the name of external service provider is requested 325. The names of external services that can be invoked by recipients are preferably pre-defined by the system. The sender is also asked 330 for the number of parameters and type of parameters that will be required from recipients to invoke external services. If the sender selects 335 embedding another applet from the applet library, the sender is requested 340 to identify the previously composed applet.

The system preferably stores a library of standard sub-dialogs and associated code templates. Examples include Options, Speech, Digits, Transfer, Notification etc., and also sender-defined sub-dialogs. At the end of each input collection from the sender, a sub-dialog invocation line is created based on the input type, Options, Speech, Digits, Transfer, Notification, etc., and given parameters for the input. A line is composed 345 in the main dialog applet for each input to invoke the corresponding sub-dialog from the library. The type of sub-dialog to be invoked is based upon the type of input. See the Appendix for a VXML example of invocation of the sub-dialogs.

The message composition interaction with the sender continues until all dialog related prompts and inputs have been collected, at which time the applet composition dialog ends 350. A dialog applet that is composed using the inputs from the sender is deposited into recipient mailboxes using existing voice mail messaging system mechanisms. The prompts and text, recipient input, and applet type are all stored with the composed message. Once the message, applet, and associated data and components have been stored the sender sends 355 the message for deposit to the recipient mailboxes. The message, applet, and associated data and components are then deposited 360 into recipient mailboxes.

The applet that has been composed 345 can be a program, VXML document, speech application language tag (SALT) document, or any other markup language type document. During message playback the system decides which execution engine is needed to run the applet by identifying the type of applet. The sender will be asked 365 whether the applet should be stored in a library for later use. The sender may elect to store the applet in a library either before or after sending the voicemail message. The sender also has the option of storing the applet to a library without sending a voicemail message. If sender replies that he or she would like to store the applet in a library, the system requests 370 the name of the applet so that it may be identified after saving to the library. The applet and its corresponding spoken/text name is then stored 375 in the applet library. If the message is intended for multiple recipients, a statistics table is also created 380 in a database that will log the number of message recipients and the inputs provided by the recipients. A notification filter is also created 385 so that the sender can be notified of the recipient responses. The sender may elect to receive notification either at the end of each recipient's access or after all recipients have read the message.

Figure 4A:
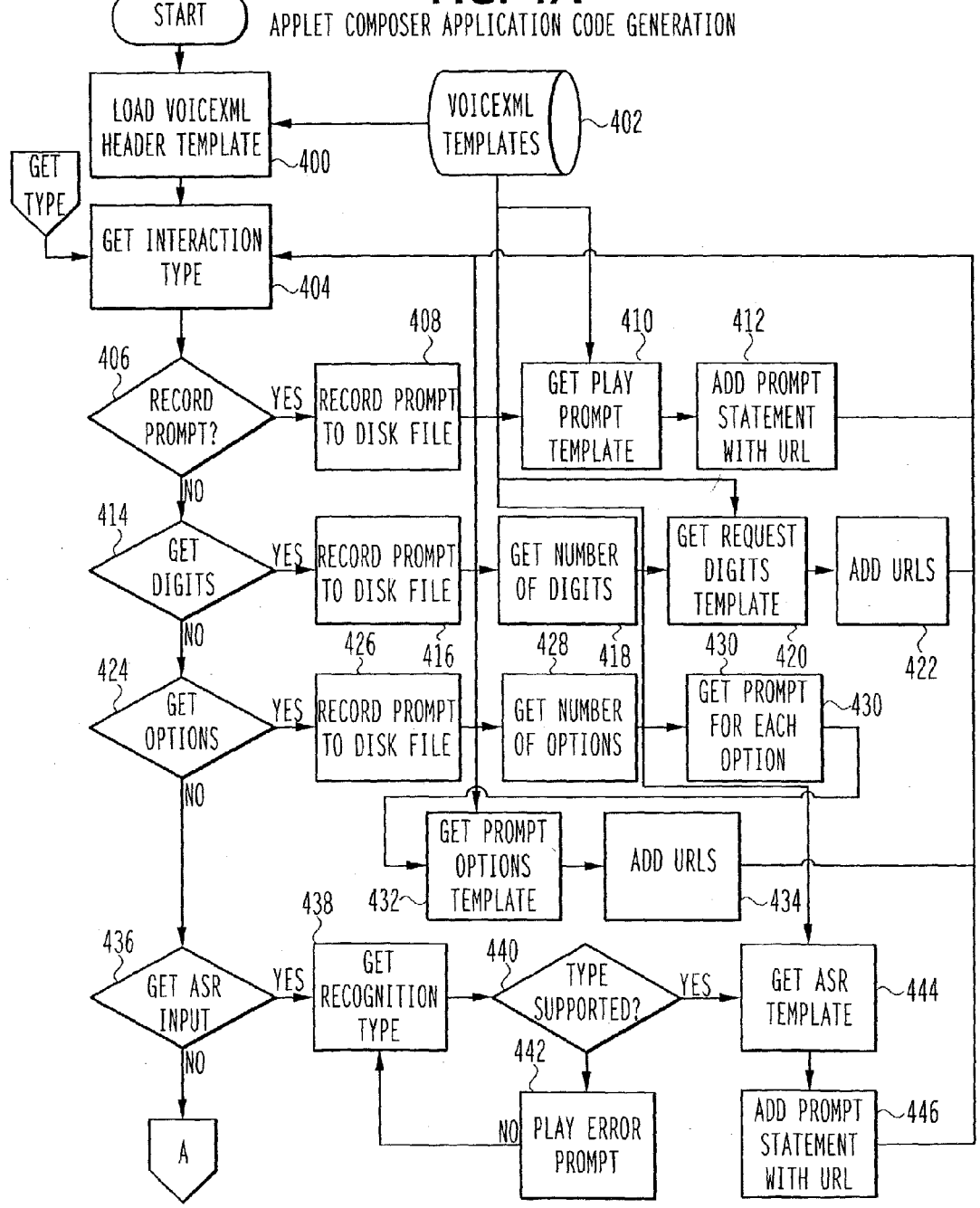
FIGS. 4A and 4B depict a flow diagram for applet composer application code generation.
Figure 4B:
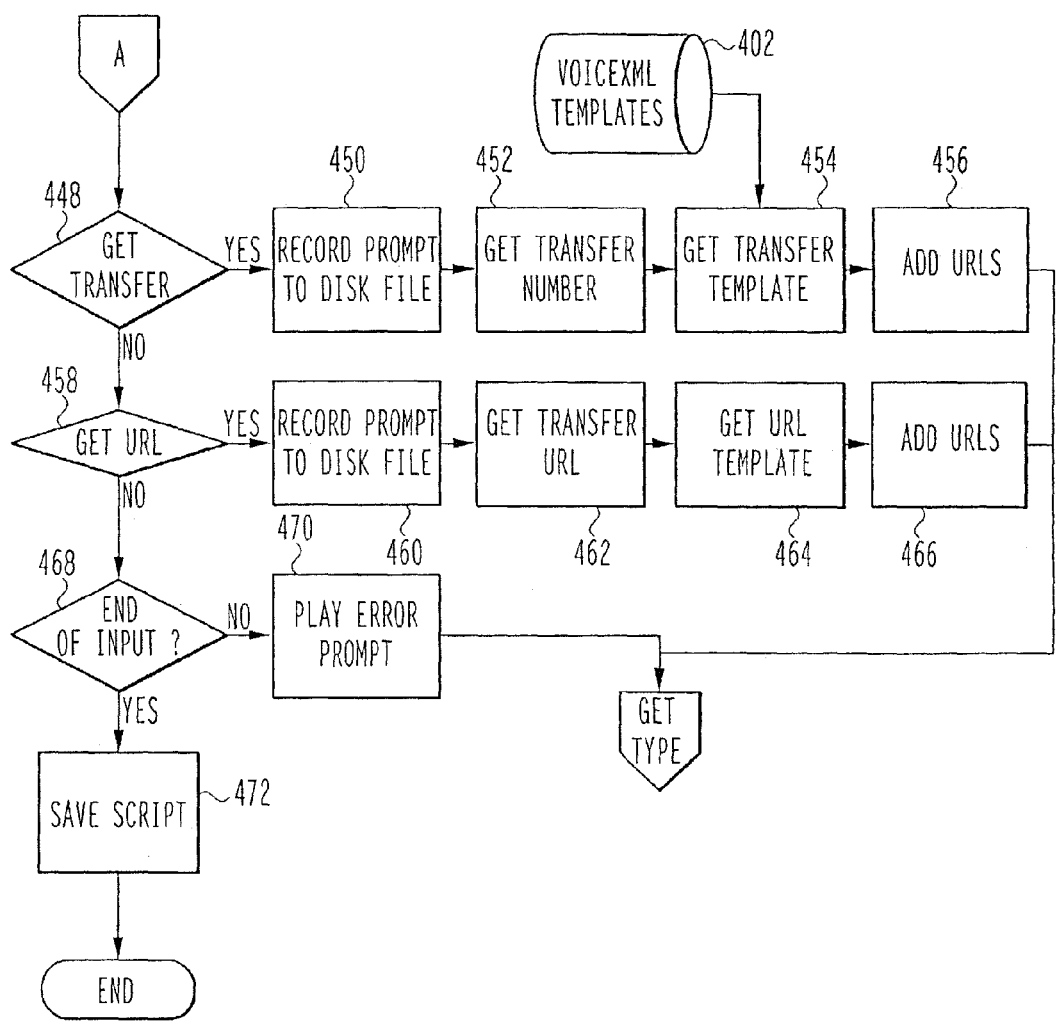

FIGS. 4A and 4B depict the processes involved in code generation by the applet composer application 120. The composer application 120 receives parameters collected from dialog with the person interacting with the system (applet composer). When the composer application starts, a VoiceXML header template is retrieved 400 from the disk-resident VoiceXML template repository 402. The Get Interaction Type process retrieves 404 the first interaction type specified by the applet composer. If the type is 406 Record Prompt then the prompt is recorded 408 to disk, the Play Prompt VoiceXML template is retrieved 410 from the VoiceXML templates data store 402, the new VoiceXML statement is attached 413 to the template, and control is returned to Get Interaction Type to retrieve 404 the next action from the applet composer.

If the type is 414 Get Digits then the prompt requesting the digits is recorded 416 to disk, the number of digits is retrieved 418 from the applet composer, the Request Digits VoiceXML template is retrieved 420 from the VoiceXML templates data store 402, the new VoiceXML statement is attached 422 to the template, and control is returned to Get Interaction Type to get 404 the next action from the applet composer.

If the type is 424 Get Options then the prompt specifying the options is recorded 426 to disk, the number of options are obtained 428 from the applet composer, the prompts for the each option are recorded 430 by the applet composer, the Prompt Options VoiceXML template is retrieved 432 from the VoiceXML templates data store 402, the new VoiceXML statement is attached 434 to the template, and control is returned to Get Interaction Type to get 404 the next action from the applet composer.

If the type is 436 Get ASR Input then the Recognition Type is requested 438 from the applet composer. If the type is determined 440 to be not supported then an error message is played 442 to the applet composer, and another type is requested 438. When type received is determined 440 to be supported, the ASR VoiceXML template is retrieved 444 from the VoiceXML templates data store 402, the new VoiceXML statement is attached 446 to the template, and control is returned to Get Interaction Type to get 404 the next action from the applet composer.

If the type is 448 Get Transfer (See FIG. 4B), then the prompt describing the transfer is recorded 450 to disk, the phone number for the transfer is retrieved 452 from the applet composer, the Transfer VoiceXML template is retrieved 454 from the VoiceXML templates data store 402, the new VoiceXML statement is attached 456 to the template, and control is returned to Get Interaction Type to get 404 the next action from the applet composer.

If the type is 458 Get URL then the prompt describing the URL is recorded 460 to disk, the URL is retrieved 462 from the applet composer, the URL VoiceXML template is retrieved 464 from the VoiceXML templates data store 402, the new VoiceXML statement is attached 466 to the template, and control is returned to Get Interaction Type to get 404 the next action from the applet composer. If the applet composer specifies 468 that there is no additional dialog, the script is saved 472 and control is returned to the applet composition application. If the applet composer specifies an unknown interaction type, an error prompt is played 470 and control is returned to Get Interaction Type to get 404 the next action from the applet composer. The above processes are extensible to allow additional interaction types to be added to the applet composition application.

Based on the operation that collected the parameters and the actual parameters collected, the composer application merges the parameters with the code statements of the template and then outputs the code statements for storage as or in the applet. This can be accomplished in several different ways. In one approach the operation information can be used to select a particular code statement or group of statements and the variables in the statement(s) are completed by the parameters and the code statement(s) are stored as part of the applet. Using the Employee Satisfaction Survey example, when the Get Options operation is activated, the initial prompt is recorded by the applet composer and saved to a disk file. The composer will select a Get Options type code statement from the template repository as shown in the Appendix Section labeled Sample Blank Template for Get Options. Next, the number of options (three in the example) is specified by the applet composer, and the three prompts are collected (one for each option), along with the action to be taken for each selection. The Get Options template is completed by inserting the variables for the prompt files and the number of options into the statements resulting in the code statement being stored as part of the applet, as shown in the Appendix Section labeled Sample Completed Template After the Applet Composer Has Specified 3 Choices from the Employee Satisfaction Survey. This selection and statement completion cycle is repeated for all of the operations and parameters that are activated in and collected in the creation collection process discussed below.

Based upon FIGS. 4A and 4B and the above description, one of ordinary skill in the art would be able to leverage the system to generate code for any other markup type language.

FIG. 5 depicts the processes involved in applet composition and deposit to the message store using a device 5 running a GUI browser. The device 5 can be a PC, PDA, 3rd generation mobile phone with Internet browser, or any other device that supports web-based connectivity to the application server. A media access unit 20 and internal processes are not necessary when the sender interacts with the system via a device 5 with a GUI browser. Using his or her device 5 and GUI browser, a message sender that wishes to interact with the system connects to the system through the GUI browser. The GUI browser communicates with the application server 115 and tells the application server 115 that the sender has indicated that he or she would like to compose an applet.

The application server 115 then invokes the applet composition application 120, which generates a document to begin the applet composition dialog with the sender. The application server 115 sends the document to the device 5 for display through the GUI browser. The sender makes an input in response to the GUI browser display and the device 5 sends the sender's input to the application server 115. The application server 115 sends the data to the applet composer application 120 and the applet composer application generates the next document for continuing the applet composition dialog with the sender. The sender interacts with the system in this manner to compose each element and corresponding sub-dialog of the applet.

The sender may also compose a standard voice mail message to accompany the applet. Whether or not the sender elects to compose a voicemail message, application server 115 will invoke the messaging application 130 for interaction with the sender. If a voice message is to be recorded, then the messaging application 130 will prompt for and record the message prior to sending the message to the message deposit server 135. Otherwise, the messaging application 130 will pass the message to the message deposit server 135 without a voice message attachment. Upon completion of the applet composition dialog and any accompanying voicemail message, the messaging application 130 sends the message with the embedded applet to the message deposit server 135. As discussed later herein, the applet execution application 140 is invoked during retrieval of the applet. The message deposit server 135 stores the message and associated links 145 to the embedded applets and metadata.

As discussed later herein, the message retrieval server 150 is invoked during retrieval of the applet. The message deposit server 135 sends the embedded applets to the applet deposit/retrieval server 155. The applet deposit/retrieval server 155 stores the applets in the database 160. The applet deposit/retrieval server 155 also interacts with the database and statistics server 165. The applet deposit/retrieval server 155 also forwards the sender's delivery and statistics notification preferences to the filter database 170. The notification server 175 is used during applet retrieval and delivery.

Figure 6:
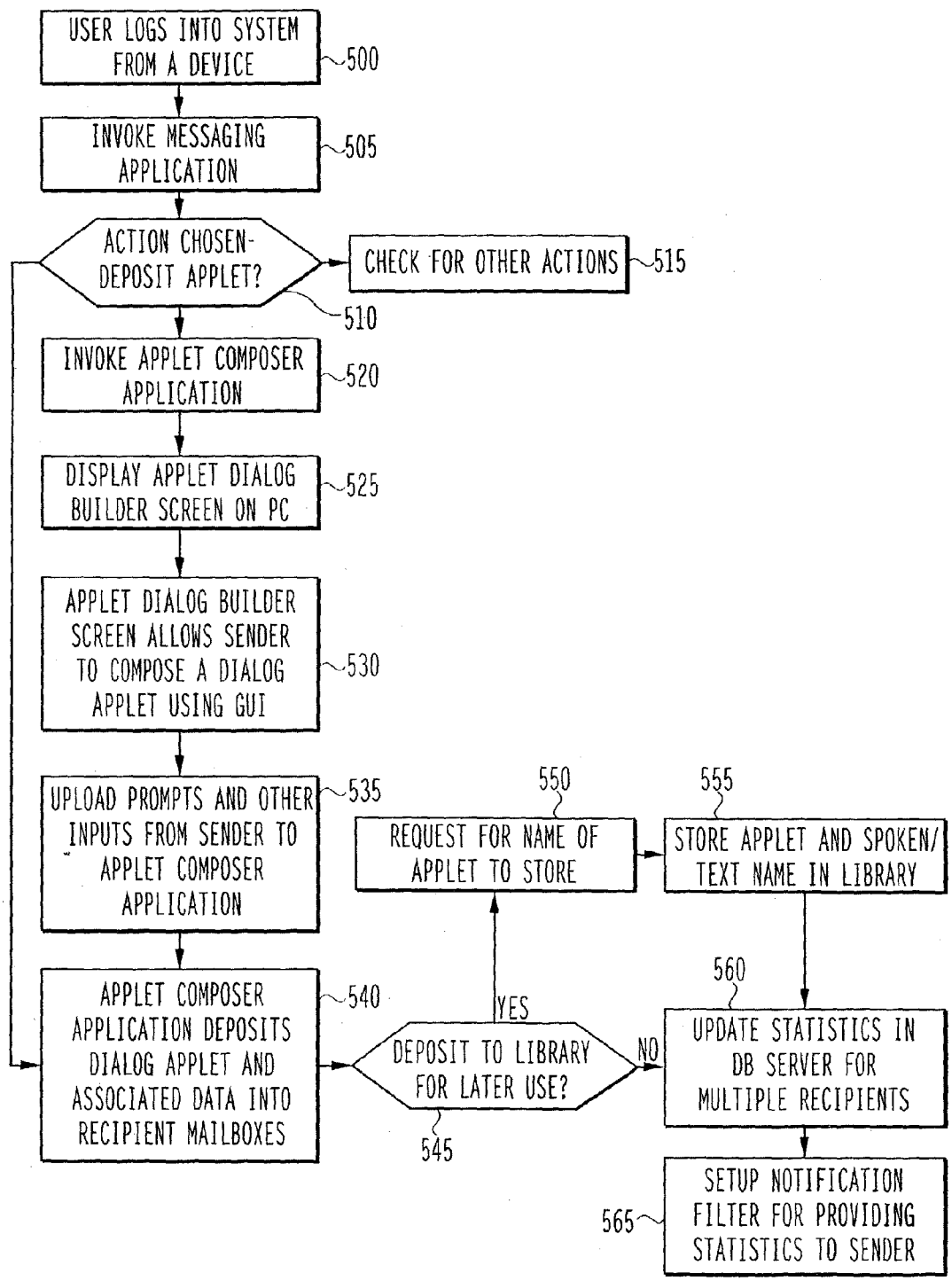
FIG. 6 depicts a flow diagram for applet composition and deposit using a device.

FIG. 6 depicts a flow diagram for applet composition and deposit using a device, which can be a PC, PDA, 3rd generation wireless phone, or any other device that supports web-based connectivity to the application server. The user interaction associated with composing a voicemail applet is simpler on a PC because of the availability of a large display screen and powerful processing. The sender logs 500 into the system either through the device's web browser or through a messaging or applet composition application installed on the device. The sender selects an option for messaging and the messaging application is invoked 505. The sender is then prompted to select 510 whether he or she would like to deposit a previously composed applet or would like to compose a new applet. If the sender does not elect to deposit a previously composed applet or to compose a new applet, the system asks 515 sender if he or she would like the system to perform another action.

If the sender elects to compose a new applet, the messaging application invokes 520 the applet composition application. An applet dialog builder is then displayed 525 on the PC screen by the applet composition application. The applet dialog builder screen allows the sender to compose 530 an applet using a GUI. The sender can record prompts, specify grammar to recognize at different stages of the applet dialog, specify external services and associated parameters, and embed other applets from the applet library. The GUI presents an interface that allows the applet creator to specify the different parts of the application. For example, a drag-and-drop interface typically presents a template of actions including but not limited to play prompt, present options, request speech, request digits, transfer, notify, invoke external service, and include applet from library. Each requested action would prompt the creator for the parameters needed to complete the action. These are the same parameters discussed with respect to the voice user interface. Other user interfaces can also be presented to the applet composer, including command line requests, dialog boxes, pull-down menus, etc. If new actions need to be added to the web-based applet creation application, a person of ordinary skill in the art can add new templates or change existing templates available to the applet composer. The sender composes 530 the applet by interacting with the device GUI using e.g., a keyboard, mouse, stylus, and microphone inputs. The applet can be built locally by running the applet composition application locally on the device or the applet can be composed on the server by using the web browser on the device. If the applet is built on the device, it is uploaded 535 along with all associated data to the server.

The applet composer application deposits 540 the applet into recipient mailboxes using existing voice mail messaging system mechanisms. Dependent upon the underlying messaging platform being utilized, the messaging application can also deposit 540 the applet into recipient mailboxes. After deposit of the message and applet into recipient mailboxes, the sender is asked 545 whether the applet should be stored in a library for later use. If sender replies in the affirmative, the system requests 550 the name of the applet so that it may be identified after saving to the library. The applet and its corresponding spoken/text name is then stored 555 in the applet library. If the message is intended for multiple recipients, a statistics table is also created 560 in a database that will log the number of message recipients and the inputs provided by the recipients. A notification filter is also created 565 so that the sender can be notified of recipient responses. The sender may elect to receive notification either at the end of each recipient's access or after all recipients have read the message.

Figure 7:
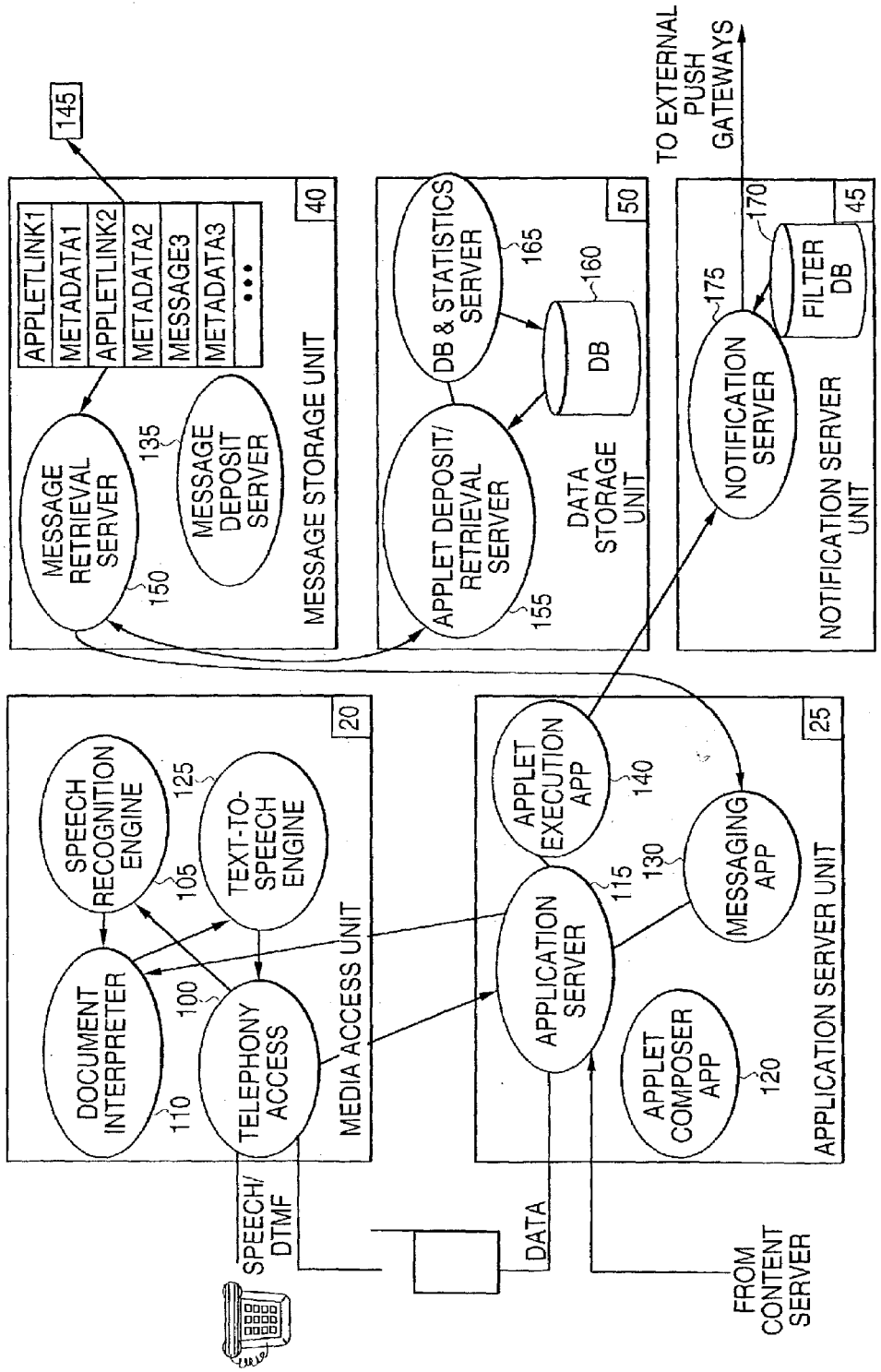
FIG. 7 depicts component interaction for applet retrieval and execution.

FIG. 7 depicts the flow of an applet recipient retrieving and executing an applet. Using his or her telephone or multi-access device, a recipient that wishes to use voice or DTMF to interact with the system connects to the system through the telephony access 100. The recipient may have been notified that he or she had a message waiting or may have simply decided to check in with the system. When the user connects to the system, the telephony access 100 notifies the document interpreter 110 of the call, and specifies that the messaging application 130 should handle the session. The document interpreter invokes the application server 115, which in turn invokes the messaging application 130. The messaging application 130 retrieves the caller's mailbox status, including metadata about any applet messages, from the message retrieval server 150. The messaging application 130 the renders this status in a markup language document, and passes it to the document interpreter 110 for presentation to the recipient through the telephony access 100. The document informs the document interpreter 110 of the grammar to be loaded to the speech recognition engine 105. The recipient indicates that he or she wants to hear the message that contains the applet through DTMF or speech. If DTMF is used, the telephony access 100 presents the keypad equivalent of the DTMF tones to the document interpreter 110. If speech is presented, it is matched against the downloaded grammar, and a token of the spoken command is returned to the document interpreter 110. In either case, the document interpreter passes the response to the application server 115. The document interpreter 110 tells the application server 115 that the recipient has indicated that he or she would like to listen to their voicemail messages.

The application server 115 passes this information back to the messaging application 130, which checks with the message retrieval server 150 for new messages. The messaging application 130 generates a document in the appropriate markup language for the communications channel (voice or data) to begin the message delivery dialog with the recipient. If the recipient is interacting with the system via voice or DTMF the messaging application 130 executing on the application server 115 sends the document to the document interpreter 110, which renders the document. If there are text-to-speech prompts to be played, the document interpreter sends the text to the text-to-speech engine 125, which sends the synthesized speech to the telephony access 100. If there are prompts to be played the document interpreter 110 passes them to the telephony access to be played. If the recipient is interacting with the system via the data channel of a multi-access device, the application server 115 will send the data directly to the multi-access device without going through the Media Access Unit 20.

The recipient makes a voice input requesting the new voicemail messages and the telephony access 100 sends the input to the speech recognition engine 105. The speech recognition engine 105 generates a token from the recipient's input based on the grammar that was specified in the document and the result is sent to the document interpreter 110. The document interpreter 110 sends the data to the application server 115. The application server 115 sends the data to the messaging application 130, which requests the messages from the message retrieval server 150. The message retrieval server 150 retrieves the recipient's new messages. If the new messages contain links 145 to embedded applets the message retrieval server 150 uses the links 145 to request the embedded applets from the applet deposit/retrieval server 155. The applet deposit/retrieval server 155 retrieves the applets from the database 160 and uses the database and statistics server 165 to store statistics regarding applet retrieval.

The applet deposit/retrieval server 155 sends the applets to the message retrieval server 150. The message retrieval server 150 sends the voicemail messages and associated applets and metadata to the messaging application 130. The messaging application 130 determines whether the messages are standard voicemail messages or contain applets that will require other applications for execution. If the voicemail messages contain embedded applets the messaging application 130 determines the type of application needed for execution of each applet by examining the applets' file types. The messaging application 130 in turn sends the messages to the application server 115, and if there are embedded applets passes a request to the application server 115 to invoke the applet execution application 140. The application server 115 then forwards the metadata associated with the applets to an appropriate applet execution application 140 for execution.

The applet execution application 140 may be any application available that is registered with the application server 115. If the applet execution application 140 generates a document, and the recipient is interacting with the system through speech or DTMF, the application server 115 will forward the document to the document interpreter 110. The document interpreter 110 interprets the document. For text-to-speech prompts, the document interpreter 110 sends the data to the text-to-speech engine 125. The text-to-speech engine 125 generates a synthesized voice prompt that is sent through the telephony access 100 to the recipient. Pointers to pre-recorded prompts are sent from the document interpreter 110 to the telephony access 110 to be played to the recipient. If the recipient is interacting with the system through the data channel of his or her multi-access device, the application server 115 will send the document generated by the applet execution application 140 to the recipient via the data channel of the multi-access device. The recipient interacts with the system in this manner to listen to each new voicemail message and to interact with any applets embedded within the messages.

Upon execution of an applet that requires recipient input, the recipient's inputs are routed through the media access unit 20 to the document interpreter 110. The document interpreter 110 sends the input through the application server 115 to the applet execution application 140. The applet execution application writes data to the DB & statistics server 165, noting the recipient response and updating the applet usage statistics. The applet execution application 140 sends the data regarding recipient inputs to the notification server 175. The notification server 175 sends the data to the sender in accordance with the sender's previously composed instructions stored in the filter database 170.

FIG. 8 depicts a flow diagram for applet retrieval and execution, more particularly the diagram describes the process used to retrieve and play a voicemail applet using a phone, multi-access device, or other web-enabled device. Multi-access devices are typically capable of providing simultaneous voice and data inputs. When the sender deposits the applet into recipient mailboxes, recipients can be notified of the new message through a message-waiting indicator or any notification mechanism such as paging, out-dial notification, SMS, MMS, WAP, PC-popup notification, or any other notification mechanism. The recipient logs 700 into the system by dialing-in or logging in through the data channel of the multi-access device. The recipient is then asked 705 if he or she would like to retrieve the message. If the recipient does not chose the option of retrieving the message the system prompts 710 the recipient for other actions.

If the recipient chooses the option of retrieving the message the system invokes the messaging application and the messaging application retrieve 715 the message and associated metadata. The messaging application retrieves 715 the message and metadata from the message queue. The messaging application determines 720 whether the message is an applet by looking at the metadata. If the message is a regular voicemail message, the message is played 725 to the recipient. If the message is an applet, it is retrieved 730 along with associated data from the database through the applet deposit/retrieval server. The particular type of applet is determined, such as a VXML applet, and the appropriate applet execution application is then invoked 735 to execute the applet and provide the user interaction. If the messaging application determines 740 that the applet is a program, the applet is executed 745 by the application server. The application server can directly provide the user interface of the applet and start the user interaction. The application server can also create a markup language document with the related user interface and user interactions, such as VXML (VXML) or SALT.

If the messaging application determines 750 that the application server has created a markup language document or the messaging application determines 755 that the applet is a markup language document, the document is sent 760 to the document Interpreter. If the applet is stored as a markup language document, it will be sent directly to the document interpreter. The document interpreter interprets the document. A user interface and interactive dialog is presented 765 to the message recipient. The user interface can be a speech-only dialog where the recipient is retrieving the message using a phone or the interface may be speech and a GUI dialog in the case of multi-access device or PC, PDA, or other similar class of device. All recipient inputs are logged 770 into the database for statistics calculation. At the end of applet execution, the notification filter created and stored by the sender during message composition is fetched and applied 775. The filter decides when to notify the sender of the interaction statistics based upon the sender's previously created preferences. (e.g., after each message retrieval or after all recipients have read their messages). Depending on the filter, the sender is notified 780 of the statistics retrieved through the Db and statistics server.

The present invention has been described with respect to creating an applet with an interactive dialog and delivering the applet by embedding into a voicemail message. Implementations for more elaborate and interactive applets, including embedding applets within applets, are contemplated and would vary accordingly. Various interactive dialogs can also be implemented that map to different time zones, dates, and currencies. Thus, the interactive dialog may also vary accordingly.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

Sample Voice Message with Embedded Applets

Below is a sample voice message containing an applet composed through sender interactions. The sample shows a message that includes a regular voice message, an embedded applet, embedded VXML, an embedded Java program that generates dynamic content, and another applet embedded within it. The format of the message is based on Voice Profile for Internet Mail Version 2 (VPIM), a proposed standard (*see,* RFC 2421 - www.ietf.org/internet-drafts/draft-ietf-vpim-vpimv2r2-05.txt) and Multipurpose Internet Mail Extensions (MIME), a set of standards (*see, supra,* RFC 2045, RFC 2046, RFC 2047, RFC 2048, RFC 2049). The use of this format to embed VXML or interactive messages is unique in this patent application.

```
;;-------Header of MIME message -----

To: +19785551212@vm1.mycompany.com
To: +19785551212@vm1.mycompany.com
From: Rajeev Dixit <11235553456@vm2.mycompany.com>
Date: Mon, 15 Oct 01 1020:30 -0700 (CDT)
MIME-Version: 1.0 (Voice 2.0)
Content-Type: Multipart/Mixed;
Boundary="MessageBoundary"
Content-Transfer-Encoding: 7bit
Message-ID: vm2.mycompany.com-123456789
Sensitivity: Private
Importance: High ;;------Start of the Voice Message (VPIM format) ----------
--MessageBoundary
Content-type: Multipart/Voice-Message; Version=2.0
Content-Transfer-Encoding: 7bit ;;------ Spoken name ----------
--MessageBoundary
Content-type: Audio/32KADPCM
Content-Transfer-Encoding: Base64
Content-Disposition: inline; voice=Originator-Spoken-Name
Content-Language: EN-US
Content-ID: part1@vm2-4321 glslfdslsertiflkTfpgkTportrpkTpfgTpoiTpdadasssdasddasdasd (This is a sample of the base-64 Spoken Name data)
fgdhgd dlkgpokpeowrit09==

;;------ Actual Voice Message ------
--MessageBoundary
Content-type: Audio/32KADPCM
Content-Transfer-Encoding: Base64
Content-Description: Voice Message
Content-Disposition: inline;voice=Voice-Message
Content-Duration=25
ilililjMzN3czdze3s7d7fwfHhcvESJVe/4yEhLz8/FOQjVFRERCESL/zqrq (This is a sample of the base64 message
``` data) zb8tFdLTQt1PXj u7wjOyRhws+krdns7Rju0t4tLF7cE0K0MxOTOnRW/Pn30c8uHi9==

;;------- Embedded VoiceXML Applet ----------
--MessageBoundary
Content-Type: Application/Applet; name="MyInteractiveMessage"; version="VoiceXML 2.0"; source=TRUE
Content-Transfer-Encoding: 7Bit <7Bit encoded VoiceXML code for the generated applet (see listing) >

;;------- Embedded Java Program Applet --------->
--MessageBoundary
Content-Type: Application/Applet; name="MyInteractiveMessage.class"; version="Java 1.4";
site="www.comverse.com:80" source=FALSE
Content-ID: <unique-id-one@foo.com>
Content-Transfer-Encoding: base64

<base64 encoded class file>

;;------- Embedded interactive message - This is fetched from VoiceMailServer2 and played ------>
--MessageBoundary
Content-Type: Multipart/Mixed; access-type=URL; URL="imap4://VoiceMailServer2/InteractiveMessage6"
Content-Transfer-Encoding: 7bit
--MessageBoundary

Sample Voice Message-Based Applet Created in VXML

Below is an example of a VXML applet as would be generated by the sender interaction discussed on pages five through seven. This sample is based on VXML version 2.0, a specification that is available on the web at www.w3.org/TR/voicexml20/.

```
<?xml version="1.0"?>
<vxml version="2.0">

<!--- top-level dialog applet auto-generated by the "Message Composer App" --->
<form>

<!----- Plays welcome prompt - "Welcome to Employee Satisfaction Survey ----->
<subdialog name="initPrompt" src="http://servername/#playPrompt">
<param name="promptURL" value="http://servername/applet1/prompts/prompt1" />
<filled>
    <goto next="#digits1" />
</filled>
</subdialog>

<!------Plays prompt and receive 5 digit employee number ----->
<!---- Please enter your 5 digit employee number ------->
<subdialog name="digits1" src="http://servername/#getDigits">
<param name="initPromptURL" value="http://servername/applet1/prompts/prompt2" />
<param name="numDigits" value="5" />
<filled>
    <goto next="#menu1" />
</filled>
</subdialog>

<!----- Plays prompt for feedback and receives menu choice ---->
<!-----"Please enter 1 if you are very satisfied with your job, 2 if you are satisfied and 3 if you are unsatisfied" --->
<!-----grammar file points to the digits grammar as 1,2,3 --->
<!---- prompt11, prompt12, prompt13 are played if the corresponding choice is selected ---->
<subdialog name="menu1" src="http://servername/#getDigitChoice">
<param name="initPromptURL" value="http://servername/applet1/prompts/prompt3" />
```

```xml
<param name="choiceURL1" value="http://servername/applet1/prompts/prompt31" />
<param name="choiceURL2" value="http://servername/applet1/prompts/prompt32" />
<param name="choiceURL3" value="http://servername/applet1/prompts/prompt33" />
<param name="numChoices" value="3" />
<filled>
<!----- if choice is 1 or 2, play the final prompt and exit ----->
    <if cond="menu1.choice == '1'">
            <goto next="#endPrompt" />
    </if>
    <if cond="menu1.choice == '2'">
            <goto next="#endPrompt" />
    </if>
<!---- if choice is 3, ask another menu is presented ----->
    <if cond="menu1.choice == '3'">
            <goto next="#menu11" />
    </if>
</filled>
</subdialog>
<!-----Plays prompt for transfer to HR ---->
<!---- Would you like to talk to human resource department. Please say "yes" or "no". --->
<!---- In this case, the grammar file has a "yesNo" grammar in it --->
<subdialog name="menu11" src="http://servername/#getYesNoChoice">
<param name="initPromptURL" value="http://servername/applet1/prompts/prompt34" />
<param name="choiceURL1" value="http://servername/applet1/prompts/prompt341" />
<param name="choiceURL2" value="http://servername/applet1/prompts/prompt342" />
<filled>
<!---- if recipient says "yes", he/she will be transferred to HR department --->
    <if cond="menu11.choice == 'yes'">
            <goto next="#transfer1" />
    </if>
<!---- if recipient says "no", play the final prompt and exit --->
    <if cond="menu11.choice == 'no'">
            <goto next="#endPrompt" />
    </if>
</filled>
</subdialog>

<!---- Transfer recipient's session to HR department ---->
<subdialog name="transfer1" src="http://servername/#transfer">
<param name="initPromptURL" value="http://servername/applet1/prompts/prompt3411" />
<param name="busyPromptURL" value="http://servername/applet1/prompts/prompt3412" />
<param name="phoneNumber" value="phone://17812132396" />
<filled>
        <goto next="#endPrompt" />
</filled
</subdialog>
<!----Play "thank you" prompt --->
<subdialog name="endPrompt" src="http://servername/#playPrompt">
<param name="promptURL" value="http://servername/applet1/prompts/prompt4" />
</subdialog>

<!--- send employee id, satisfaction rating and transfer statistics to the DB server for logging --->
<filled>
<submit namelist="digits1.number menu1.choice menu11.choice" next="http://servername/logStats" />
</filled>

</form>
<!---------------------- End of Main Applet ---------------------------------------------------------------->
<!---------------------- Component Library of subdialogs used by all applets ---------------------->
<!------ Subdialog to play prompt ---->
```

```
<form id="playPrompt">
<var name="promptURL" />
    <audio expr="promptURL" />
</form>

<!----- Subdialog to accept DTMF or spoken digits ---->
<form id="getDigits">
<var name="initPromptURL" />
<var name="numDigits" />
    <field name="number" type="digits" modal="false">
        <audio expr="initPromptURL" />
        <noinput>
            <audio
              src="http://servername/common/prompts/no_input.wav"> I am sorry, I did not hear you
            </audio>
        </noinput>
        <nomatch>
            <audio
              src="http://servername/common/prompts/not_valid.wav"> I am sorry, that is not a valid input
            </audio>
            <reprompt/>
        </nomatch>
        <filled>
            <if cond="number.length != numDigits">
                <clear namelist="number" />
                <goto #getDigits />
            <else />
                <return namelist="number" />
            </if>
        </filled>
    </field>
</form>
<!---- Subdialog to return choice based on the builtin grammars ------------------>
<form id="getDigitChoice" >
<var name="initPromptURL" />
<var name="numChoices" />
<var name="choiceURL0" />
<var name="choiceURL1" />
<var name="choiceURL2" />
<var name="choiceURL3" />
<var name="choiceURL4" />
<var name="choiceURL5" />
<var name="choiceURL6" />
<var name="choiceURL7" />
<var name="choiceURL8" />
<var name="choiceURL9" />
    <field name="selectedChoice" type="digits" modal="false">
        <audio expr="initPromptURL" />
        <grammar type="application/srgs+xml"
src="http://servername/common/grammars/builtingrammar#singleDigit.grxml" />
        <filled>
            <if cond="selectedChoice.length != '1'">
                <clear namelist="selectedChoice" />
                <goto #getDigitChoice />
            <else />
                <if cond="selectedChoice == '0'">
                    <audio expr="choiceURL0" />
                </if>
                <if cond="selectedChoice == '1'">
```

```xml
                    <audio expr="choiceURL1" />
                </if>
                <if cond="selectedChoice == '2'">
                    <audio expr="choiceURL2" />
                </if>
                <if cond="selectedChoice == '3'">
                    <audio expr="choiceURL3" />
                </if>
                <if cond="selectedChoice == '4'">
                    <audio expr="choiceURL4" />
                </if>
                <if cond="selectedChoice == '5'">
                    <audio expr="choiceURL5" />
                </if>
                <if cond="selectedChoice == '6'">
                    <audio expr="choiceURL6" />
                </if>
                <if cond="selectedChoice == '7'">
                    <audio expr="choiceURL7" />
                </if>
                <if cond="selectedChoice == '8'">
                    <audio expr="choiceURL8" />
                </if>
                <if cond="selectedChoice == '9'">
                    <audio expr="choiceURL9" />
                </if>
                <return namelist="selectedChoice" />
            </if>
        </filled>
    </field>
</form>
<!---- Subdialog to return choice based on the builtin "yesno"grammars ------------------>
<form id="getYesNoChoice" >
<var name="initPromptURL" />
<var name="choiceURL1" />
<var name="choiceURL2" />

<field name="selectedChoice"  modal="false">
        <audio expr="initPromptURL" />
        <grammar type="application/srgs+xml"
src="http://servername/common/grammars/builtingrammar#yesno.grxml" />
        <filled>
            <return namelist="selectedChoice" />
        </filled>
    </field>
</form>

<!----- Subdialog to transfer caller ---->
<form id="transfer">
    <var name="initPromptURL" />
    <var name="busyPromptURL" />
    <var name="phoneNumber" />
    <audio expr="initPromptURL" />
    <transfer name="transfer1" dest="phoneNumber">
    <filled>
        <if cond="transfer1 == 'busy'">
            <audio expr="busyPromptURL" />
            <var name="status" expr="false" />
        <else />
            <var name="status" expr="true" />
```

```
        </if>
            <return namelist="status" />
      </filled>
   </form>
</vxml>
```

Sample Voice Message-Based Applet Created in VXML

Corresponding to Stock Quote Retrieval Dialog

Below is an example of a VXML applet as would be generated by the sender interaction discussed on pages seven through eight. This sample is based on VXML version 2.0, a specification that is available on the web at www.w3.org/TR/voicexml20/. There would be an underlying program, typically in Java, which dynamically generates the VXML at runtime.

```
<?xml version="1.0"?>
<vxml version="2.0">

<!--- top-level dialog applet auto-generated by the program produced by the "Message Composer App" --->
<form>

<!----- Plays welcome prompt - "Welcome to the Stock Quote Service ----->
<subdialog name="initPrompt" src="http://servername/#playPrompt">
<param name="promptURL" value="http://servername/applet1/prompts/prompt1" />
</subdialog>

<!----- Plays prompt for feedback and receives menu choice ---->
<!-----Plays the prompt in file "//servername/applet1/prompts/prompt3"----->
<!-----"Please enter 1 if you would like to hear the current stock price of your favorite stocks, 2 if you would like to
edit your favorite stock symbol list and 3 to quit" --->
<!-----grammar file points to the digits grammar as 1,2,3 --->
<!---- prompt31, prompt32, prompt33 are played if the corresponding choice is selected ---->

<subdialog name="menu1" src="http://servername/#getDigitChoice">
<param name="initPromptURL" value="http://servername/applet1/prompts/prompt3" />
<param name="numChoices" value="3" />
<param name="choiceURL1" value="http://servername/applet1/prompts/prompt31" />
<param name="choiceURL2" value="http://servername/applet1/prompts/prompt32" />
<param name="choiceURL3" value="http://servername/applet1/prompts/prompt33" />
<filled>

<!----- 1 is selected, play the generated prompts. ----->
      <if cond="menu1.selectedChoice == '1'">
            <prompt>
                  Please wait <break time="250ms"/> accessing current stock prices.
                  <break time="2s"/>
                  ABC is one hundred and one dollars twenty two cents
                  XYZ is twenty four dollars and thre cents
                  LLL is three dollars and forty five cents
            </prompt>
      </if>

<!----- 2 is selected ----->
      <if cond="menu1.selectedChoice == '2'">
            <goto next="#getChars" />
      </if>

<!---- if choice is 3, exit ----->
      <if cond="menu1.selectedChoice == '3'">
```

```xml
            <goto next="#endPrompt" />
        </if>
    </filled>
</subdialog>

<!-----Get character data----->
<subdialog name="getChars">
<field name="stock_symbol">
<prompt>
    Please say the letters of the symbol to be added or deleted
    <submit namelist="stock_symbol" method="'post">
</prompt>

<!----Play end prompt --->
<subdialog name="endPrompt" src="http://servername/#playPrompt">
<param name="promptURL" value="http://servername/applet1/prompts/prompt4" />
</subdialog>

</form>
<!---------------------- End of Main Applet ------------------------------------------------------->

<!---------------------- Component Library of subdialogs used by all applets --------------------->
<!----- Subdialog to play prompt ---->
<form id="playPrompt">
<var name="promptURL" />
    <audio expr="promptURL" />
    <return />
</form>

<!---- Subdialog to return choice based on the builtin grammars ------------------>
<form id="getDigitChoice" >
<var name="initPromptURL" />
<var name="numChoices" />
<var name="choiceURL0" />
<var name="choiceURL1" />
<var name="choiceURL2" />
<var name="choiceURL3" />
<var name="choiceURL4" />
<var name="choiceURL5" />
<var name="choiceURL6" />
<var name="choiceURL7" />
<var name="choiceURL8" />
<var name="choiceURL9" />
        <field name="selectedChoice" type="digits" modal="false">
            <audio expr="initPromptURL" />
            <grammar type="application/srgs+xml"
src="http://servername/common/grammars/builtingrammar#singleDigit.grxml" />
            <filled>
                    <if cond="selectedChoice == '0'">
                            <audio expr="choiceURL0" />
                    </if>
                    <if cond="selectedChoice == '1'">
                            <audio expr="choiceURL1" />
                    </if>
                    <if cond="selectedChoice == '2'">
                            <audio expr="choiceURL2" />
                    </if>
                    <if cond="selectedChoice == '3'">
                            <audio expr="choiceURL3" />
                    </if>
```

```xml
            <if cond="selectedChoice == '4'">
                    <audio expr="choiceURL4" />
            </if>
            <if cond="selectedChoice == '5'">
                    <audio expr="choiceURL5" />
            </if>
            <if cond="selectedChoice == '6'">
                    <audio expr="choiceURL6" />
            </if>
            <if cond="selectedChoice == '7'">
                    <audio expr="choiceURL7" />
            </if>
            <if cond="selectedChoice == '8'">
                    <audio expr="choiceURL8" />
            </if>
            <if cond="selectedChoice == '9'">
                    <audio expr="choiceURL9" />
            </if>
            <return namelist="selectedChoice" />
        </filled>
    </field>
</vxml>
```

Sample Blank Template for Get Options

```
<!----- Plays prompt for feedback and receives menu choice ----->
<!----- The prompt to be played is solicited from the app creator and written to a disk file when the app is created ---->
<!-----grammar file points to the digits grammar as 1,2,3 ----->
<!---- additional prompts that are played if the corresponding choice is selected are also solicited from the app creator and written to disk files ---->

<!----- getDigitChoice is a subdialog that is stored in the template collection and integrated into the application
and called at runtime with the prompt files and number of choices as specified by the app creator ----->

<subdialog name="menu1" src="http://servername/#getDigitChoice">

<!----- the following prompt is the initial prompt to be played with the choices ----->
<param name="initPromptURL" value= FILLED_IN_AT_CREATION_TIME />

<!-----the number of choices written to the final VoiceXML is based on the number of choices specified by the app creator ---->

<param name="choiceURL1" value= FILLED_IN_AT_CREATION_TIME />
<param name="choiceURL2" value= FILLED_IN_AT_CREATION_TIME />
<param name="choiceURL3" value= FILLED_IN_AT_CREATION_TIME />

<!----- this parameter contains the number of choices ----->

<param name="numChoices" value= FILLED_IN_AT_CREATION_TIME />

<filled>

<!----- for each choice determine the next action – if the app creator specifies to exit the next = #endPrompt;
otherwise go to the computed next action. In the final document there will be one line for each choice up to the
number of choices specified by the app creator ----->

<if cond="menu1.choice == '1'">
                <goto next= FILLED_IN_AT_CREATION_TIME />
        </if>
```

```
                <if cond="menu1.choice == '2'">
                        <goto next= FILLED_IN_AT_CREATION_TIME />
                </if>
                <if cond="menu1.choice == '3'">
                        <goto next= FILLED_IN_AT_CREATION_TIME />
                </if>
        </filled>
</subdialog>
<!---- Play end prompt recorded by app creator ----->
<subdialog name="endPrompt" src="http://servername/#playPrompt">
        <param name="promptURL" value= FILLED_IN_AT_CREATION_TIME />
</subdialog>

<!----- Subdialog to return choice based on the built-in grammars ----->
<form id="getDigitChoice" >
<var name="initPromptURL" />
<var name="numChoices" />
<var name="choiceURL0" />
<var name="choiceURL1" />
<var name="choiceURL2" />
<var name="choiceURL3" />
<var name="choiceURL4" />
<var name="choiceURL5" />
<var name="choiceURL6" />
<var name="choiceURL7" />
<var name="choiceURL8" />
<var name="choiceURL9" />
        <field name="selectedChoice" type="digits" modal="false">
                <audio expr="initPromptURL" />
                <grammar type="application/srgs+xml"
src="http://servername/common/grammars/builtingrammar#singleDigit.grxml" />
                <filled>
                        <if cond="selectedChoice.length != '1'">
                                <clear namelist="selectedChoice" />
                                <goto #getDigitChoice />
                        <else />
                                <if cond="selectedChoice == '0'">
                                        <audio expr="choiceURL0" />
                                </if>
                                <if cond="selectedChoice == '1'">
                                        <audio expr="choiceURL1" />
                                </if>
                                <if cond="selectedChoice == '2'">
                                        <audio expr="choiceURL2" />
                                </if>
                                <if cond="selectedChoice == '3'">
                                        <audio expr="choiceURL3" />
                                </if>
                                <if cond="selectedChoice == '4'">
                                        <audio expr="choiceURL4" />
                                </if>
                                <if cond="selectedChoice == '5'">
                                        <audio expr="choiceURL5" />
                                </if>
                                <if cond="selectedChoice == '6'">
                                        <audio expr="choiceURL6" />
                                </if>
                                <if cond="selectedChoice == '7'">
                                        <audio expr="choiceURL7" />
                                </if>
```

```
                <if cond="selectedChoice == '8'">
                        <audio expr="choiceURL8" />
                </if>
                <if cond="selectedChoice == '9'">
                        <audio expr="choiceURL9" />
                </if>
                <return namelist="selectedChoice" />
        </if>
    </filled>
  </field>
</form>
```

Sample Completed Template After the Applet Composer has Specified 3 Choices from the Employee Satisfaction Survey

```
<!----- Plays prompt for feedback and receives menu choice ----->
<!----- The prompt to be played is solicited from the app creator and written to a disk file when the app is created
----->
<!-----grammar file points to the digits grammar as 1,2,3 ----->
<!---- additional prompts that are played if the corresponding choice is selected are also solicited from the app
creator and written to disk files ---->

<!----- getDigitChoice is a subdialog that is stored in the template collection and integrated into the application
and called at runtime with the prompt files and number of choices as specified by the app creator ----->

<subdialog name="menu1" src="http://servername/#getDigitChoice">
<!----- the following prompt is the initial prompt to be played with the choices ----->
<param name="initPromptURL" value="http://servername/applet1/prompts/prompt3"/>

<!-----the number of choices written to the final VoiceXML is based on the number of choices specified by the app
creator ---->

<param name="choiceURL1" value="http://servername/applet1/prompts/prompt31"/>
<param name="choiceURL2" value="http://servername/applet1/prompts/prompt32"/>
<param name="choiceURL3" value="http://servername/applet1/prompts/prompt33"/>

<!----- this parameter contains the number of choices ----->

<param name="numChoices" value="3" />
<filled>
<!----- for each choice determine the next action – if the app creator specifies to exit the next = #endPrompt;
otherwise go to the computed next action. In the final document there will be one line for each choice up to the
number of choices specified by the app creator ----->

<if cond="menu1.choice == '1'">
                <goto next="#endPrompt" />
        </if>
        <if cond="menu1.choice == '2'">
                <goto next="#endPrompt" />
        </if>
        <if cond="menu1.choice == '3'">
                <goto next="#menu11" />
        </if>
</filled>

</subdialog>
<!---- Play end prompt recorded by app creator ----->
<subdialog name="endPrompt" src="http://servername/#playPrompt">
<param name="promptURL" value= "http://servername/applet1/prompts/prompt4'/>
</subdialog>
```

```xml
<!----- Subdialog to return choice based on the built-in grammars ----->
<form id="getDigitChoice" >
<var name="initPromptURL" />
<var name="numChoices" />
<var name="choiceURL0" />
<var name="choiceURL1" />
<var name="choiceURL2" />
<var name="choiceURL3" />
<var name="choiceURL4" />
<var name="choiceURL5" />
<var name="choiceURL6" />
<var name="choiceURL7" />
<var name="choiceURL8" />
<var name="choiceURL9" />
    <field name="selectedChoice" type="digits" modal="false">
            <audio expr="initPromptURL" />
            <grammar type="application/srgs+xml" src="http://servername/common/grammars/builtingrammar#singleDigit.grxml" />
            <filled>
                    <if cond="selectedChoice.length != '1'">
                            <clear namelist="selectedChoice" />
                            <goto #getDigitChoice />
                    <else />
                            <if cond="selectedChoice == '0'">
                                    <audio expr="choiceURL0" />
                            </if>
                            <if cond="selectedChoice == '1'">
                                    <audio expr="choiceURL1" />
                            </if>
                            <if cond="selectedChoice == '2'">
                                    <audio expr="choiceURL2" />
                            </if>
                            <if cond="selectedChoice == '3'">
                                    <audio expr="choiceURL3" />
                            </if>
                            <if cond="selectedChoice == '4'">
                                    <audio expr="choiceURL4" />
                            </if>
                            <if cond="selectedChoice == '5'">
                                    <audio expr="choiceURL5" />
                            </if>
                            <if cond="selectedChoice == '6'">
                                    <audio expr="choiceURL6" />
                            </if>
                            <if cond="selectedChoice == '7'">
                                    <audio expr="choiceURL7" />
                            </if>
                            <if cond="selectedChoice == '8'">
                                    <audio expr="choiceURL8" />
                            </if>
                            <if cond="selectedChoice == '9'">
                                    <audio expr="choiceURL9" />
                            </if>
                            <return namelist="selectedChoice" />
                    </if>
            </filled>
    </field>
</form>
```

What is claimed is:

1. A method, comprising:
    allowing a user to create an applet; and
    embedding the applet within a voicemail message and transferring the applet with the voice message to multiple voice messaging systems that use various delivery platforms, where the applet is enabled to receive inputs from the multiple voice messaging systems.

2. A method as recited in claim 1 further comprising allowing another user to retrieve the voicemail message invoking execution of the applet.

3. A method as recited in claim 2, wherein the applet is created through a voice interface.

4. A method as recited in claim 3, wherein the applet is created via a graphical user interface.

5. A method as recited in claim 4, wherein the user can create additional applets and embed the applets within the first applet.

6. A method as recited in claim 5, wherein applet contents are comprised of voicemails, emails, web pages, other applets, and programs.

7. A method as recited in claim 6, wherein the voicemail message may be stored within a message queue and retrieved by multiple recipients upon logging into a voice messaging system.

8. A method as recited in claim 7, wherein the voicemail message and embedded applets are delivered via a voice messaging system.

9. A method as recited in claim 8, wherein an execution engine for the applet is identified by the system
    and the system may invoke any applications available for executing the applet on a device used by the recipient to receive the voicemail message.

10. A method as recited in claim 9, wherein the system collects statistics regarding receipt of the voicemail message, and the system collects statistics regarding the execution of the applet, and the system collects statistics regarding the user input received by the applet, and the user can specify system capabilities and options for notifying the user of message receipt and statistics.

11. A method as recited in claim 10, wherein the user can store the created voicemail message and applets for subsequent use.

12. A system, comprising:
    a first device for communicating with a first voice messaging system; and
    a server composing voicemail messages; and
    a second server composing applets and embedding the applets within the voicemail messages; and
    a second device for receiving voicemail messages including the embedded applets with a second voice messaging system, where the second voice messaging system has a different delivery platform than the first voice messaging system and the applets are enabled to receive inputs from the second voice messaging system.

13. A system as recited in claim 12, further comprising a message storage unit storing created voicemail messages.

14. A system as recited in claim 13, further comprising a data storage unit storing applets that may be embedded into voicemail messages.

15. A system as recited in claim 14, further comprising a notification server unit notifying voicemail message senders of statistics related to the voicemail messages.

16. An apparatus, comprising:
    a media access unit receiving inputs from a user and interpreting the inputs and producing a set of instructions;
    an application server unit receiving said set of instructions and invoking applications for creating and retrieving a voicemail message and an applet;
    a message storage unit storing said voicemail message;
    a data storage unit storing said applet; and
    a notification server unit notifying the user of statistics related to the voicemail message and said applet based on delivery of said applet with the voice message to a voice messaging system, where said applet is enabled to receive inputs from the voice messaging system.

17. An apparatus as recited in claim 16, further comprising:
    a multi-access device sending inputs to the media access unit and receiving inputs from the media access unit.

18. An apparatus as recited in claim 17, further comprising:
    a personal computer sending inputs to the media access unit and receiving inputs from the media access unit.

19. A computer readable storage controlling a computer by allowing a user to create a voicemail message with an embedded applet and sending the voicemail message to multiple recipients using voice messaging systems that use various delivery platforms, where the applet is enabled to receive inputs from the voice messaging systems.

20. A computer readable storage controlling a computer having a data structure comprising a voicemail message, an applet embedded in the voicemail message and a VoiceXML, SALT, or other markup-based document embedded in the applet, where the applet is delivered to multiple voice messaging systems that use various delivery platforms and the applet is enabled to receive inputs from the multiple voice messaging systems.

21. A method of delivering voice message based applets, comprising:
    allowing a user to create an applet and embedding the applet within a voicemail message; and
    transmitting the voicemail message with the embedded applet using a voice messaging system, where the applet is enabled to receive inputs from a recipient using the multiple voice messaging system.

22. A method of delivering a voice message having embedded applets, comprising:
    sending a voice message including an applet embedded in a payload of the voice message, said applet having a dynamic content; and
    executing the applet locally via a portable device of a recipient of the voice message and providing the dynamic content to the recipient, where the applet is enabled to receive inputs from multiple voice message systems.

* * * * *